(12) United States Patent
Sato et al.

(10) Patent No.: US 11,150,517 B2
(45) Date of Patent: Oct. 19, 2021

(54) OPTICAL ELEMENT, LIGHT GUIDE ELEMENT, AND IMAGE DISPLAY DEVICE

(71) Applicant: FUJIFILM Corporation, Tokyo (JP)

(72) Inventors: Hiroshi Sato, Minami-ashigara (JP); Yukito Saitoh, Minami-ashigara (JP); Ayako Muramatsu, Minami-ashigara (JP); Daisuke Kashiwagi, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/034,182

(22) Filed: Sep. 28, 2020

(65) Prior Publication Data

US 2021/0011319 A1 Jan. 14, 2021

Related U.S. Application Data

(63) Continuation of application No. PCT/JP2019/014163, filed on Mar. 29, 2019.

(30) Foreign Application Priority Data

Mar. 29, 2018 (JP) .............................. JP2018-064720

(51) Int. Cl.
*G02F 1/13363* (2006.01)
*G02B 5/18* (2006.01)
(Continued)

(52) U.S. Cl.
CPC ........... *G02F 1/13363* (2013.01); *G02B 5/18* (2013.01); *G02B 6/005* (2013.01); *G02F 1/1337* (2013.01);
(Continued)

(58) Field of Classification Search
CPC .................................................... G02B 5/3016
See application file for complete search history.

(56) References Cited

U.S. PATENT DOCUMENTS

2006/0152656 A1* 7/2006 Kashima .............. G02B 5/3016
349/113
2008/0278675 A1 11/2008 Escuti et al.
(Continued)

FOREIGN PATENT DOCUMENTS

JP 2004-190157 A 7/2004
JP 2005-49866 A 2/2005
(Continued)

OTHER PUBLICATIONS

Cheng et al., "Analysis of a dual-twist Pancharatnam phase device with ultrahigh-efficiency large-angle optical beam steering," Applied Optics, vol. 54, No. 34, Dec. 1, 2015, pp. 10035-10043.
(Continued)

*Primary Examiner* — Sang V Nguyen
(74) *Attorney, Agent, or Firm* — Birch, Stewart, Kolasch & Birch, LLP

(57) ABSTRACT

Provided is an optical element in which transmission of incident light with an angle in a predetermined direction is allowed and the brightness of transmitted light is high. The optical element is formed using a composition including a liquid crystal compound and has a liquid crystal alignment pattern in which a direction of an optical axis derived from the liquid crystal compound rotates in one direction; and the optically-anisotropic layer has regions in which the optical axis is twisted in a thickness direction of the optically-anisotropic layer and rotates, the regions having different magnitudes of twist angles of the rotation in a plane.

14 Claims, 9 Drawing Sheets

(51) Int. Cl.
*F21V 8/00* (2006.01)
*G02F 1/1335* (2006.01)
*G02F 1/1337* (2006.01)

(52) U.S. Cl.
CPC .. *G02F 1/133528* (2013.01); *G02F 1/133541* (2021.01)

(56) References Cited

U.S. PATENT DOCUMENTS

| | | |
|---|---|---|
| 2010/0225876 A1 | 9/2010 | Escuti et al. |
| 2015/0205182 A1 | 7/2015 | Leister |
| 2016/0033698 A1 | 2/2016 | Escuti et al. |
| 2016/0231568 A1* | 8/2016 | Saarikko ............ G02B 27/0172 |
| 2017/0373459 A1 | 12/2017 | Weng et al. |
| 2018/0143438 A1 | 5/2018 | Oh |
| 2018/0164480 A1* | 6/2018 | Yoshida ............... G02B 6/0055 |
| 2019/0086786 A1 | 3/2019 | Katoh et al. |

FOREIGN PATENT DOCUMENTS

| | | |
|---|---|---|
| JP | 2007-504484 A | 3/2007 |
| JP | 2008-532085 A | 8/2008 |
| JP | 2010-525394 A | 7/2010 |
| JP | 2017-522601 A | 8/2017 |
| JP | 2019-536101 A | 12/2019 |
| WO | WO 2005/019379 A1 | 3/2005 |
| WO | WO 2016/194961 A1 | 12/2016 |
| WO | WO 2017/199812 A1 | 11/2017 |

OTHER PUBLICATIONS

International Preliminary Report on Patentability and English translation of the Written Opinion of the International Searching Authority (Forms PCT/IB/326, PCT/IB/373, and PCT/ISA/237) for International Application No. PCT/JP2019/014163, dated Oct. 8, 2020.
International Search Report (Form PCT/ISA/210) for International Application No. PCT/JP2019/014163, dated May 7, 2019.
Kim et al., "Fabrication of ideal geometric-phase holograms with arbitrary wavefronts," Optica, vol. 2, No. 11, Nov. 2015, pp. 958-964.
Japanese Notice of Reasons for Refusal for corresponding Japanese Application No. 2020-511122, dated Jul. 13, 2021, with an English translation.

* cited by examiner

OPTICAL ELEMENT, LIGHT GUIDE ELEMENT, AND IMAGE DISPLAY DEVICE

CROSS-REFERENCE TO RELATED APPLICATIONS

This application is a Continuation of PCT International Application No. PCT/JP2019/014163 filed on Mar. 29, 2019, which claims priority under 35 U.S.C. § 119(a) to Japanese Patent Application No. 2018-064720 filed on Mar. 29, 2018. The above application is hereby expressly incorporated by reference, in its entirety, into the present application.

BACKGROUND OF THE INVENTION

1. Field of the Invention

The present invention relates to an optical element that diffracts incident light, and a light guide element and an image display device including the optical element.

2. Description of the Related Art

An optical element that controls a direction of light is used in various optical devices or systems.

For example, the optical element that controls a direction of light is used in various optical devices that display a virtual image, various information, or the like to be superimposed on a backlight unit of a liquid crystal display device and a scene that is actually being seen, for example, a head-mounted display (HMD) such as Augmented Reality (AR) glasses, a projector, a beam steering device, or a sensor for detecting an object or measuring the distance to an object.

In this optical device, a reduction in thickness and size has progressed. Therefore, a reduction in thickness and size is desired for the optical element used in the optical device.

JP2008-532085A discloses a diffractive optical element that is formed by patterning a thin film having optical anisotropy. By using an optically-anisotropic layer that changes a liquid crystal alignment pattern in a plane, an optical element that is formed of a thin film and controls a transmitting direction of incidence light can be realized.

SUMMARY OF THE INVENTION

However, an element that changes a liquid crystal alignment pattern in a plane to diffract light is expected to be applied as an optical member for various optical devices. However, as described in HsienHui Cheng et al., Analysis of a dual-twist Pancharatnam phase device with ultrahigh-efficiency large-angle optical beam steering, Applied Optics, Vol. 54, No 34, pp. 10035-10043 (2015), the element that changes a liquid crystal alignment pattern in a plane to diffract light has a problem in that, in a case where the diffraction angle increases, the diffraction efficiency decreases, that is, the intensity of diffracted light decreases.

In order to solve the problem, in the element described in HsienHui Cheng et al., Analysis of a dual-twist Pancharatnam phase device with ultrahigh-efficiency large-angle optical beam steering, Applied Optics, Vol. 54, No 34, pp. 10035-10043 (2015) that changes a liquid crystal alignment pattern in a plane to diffract light, in a case where the diffraction angle is large, the alignment of liquid crystal is twisted in a thickness direction. As a result, even in a case where the diffraction angle is large, the brightness of transmitted light can increase by suppressing a decrease in diffraction efficiency, that is, increasing the intensity of diffracted light.

However, in an element that exhibits a lens function by changing a liquid crystal alignment pattern in a plane to diffract light as described in Jihwan Kim et al., Fabrication of ideal geometric-phase holograms with arbitrary wavefronts, Optica, Vol. 2, No. 11, pp. 958-964 (2015), the diffraction angle varies depending on light incidence positions. Therefore, there is a difference in diffraction efficiency between incidence positions in a plane of the element. That is, there is a region where the brightness of transmitted light is low depending on incidence positions in a plane of the element.

An object of the present invention is to solve the problems of the related art and to provide an optical element in which transmission of incident light with an angle in a predetermined direction is allowed and the brightness of the transmitted light is high.

In order to achieve the object, an optical element according to an aspect of the present invention has the following configurations.

[1] An optical element comprising:
an optically-anisotropic layer that is formed using a liquid crystal composition including a liquid crystal compound,
in which the optically-anisotropic layer has a liquid crystal alignment pattern in which a direction of an optical axis derived from the liquid crystal compound changes while continuously rotating in at least one in-plane direction, and
the optically-anisotropic layer has regions in which the optical axis is twisted in a thickness direction of the optically-anisotropic layer and rotates, the regions having different magnitudes of twist angles in the thickness direction in a plane.

[2] The optical element according to [1],
in which in a case where a length over which the direction of the optical axis derived from the liquid crystal compound rotates by 180° in a plane is set as a single period, the optically-anisotropic layer has regions having different lengths of the single periods in the liquid crystal alignment pattern.

[3] The optical element according to [2],
in which a plurality of regions having different lengths of the single periods in the liquid crystal alignment pattern are arranged in order of the length of the single period in the optically-anisotropic layer,
the plurality of regions having different magnitudes of twist angles in the thickness direction are arranged in order of the magnitude of the twist angle in the thickness direction, and
the optically-anisotropic layer has a region in which a direction of a permutation of the lengths of the single periods is different from a direction of a permutation of the magnitudes of the twist angles in the thickness direction.

[4] The optical element according to any one of [1] to [3],
in which the optically-anisotropic layer has a region in which the magnitudes of the twist angles in the thickness direction are 10 to 360°.

[5] The optical element according to any one of [1] to [4],
in which in the optically-anisotropic layer, the length of the single period in the liquid crystal alignment pattern gradually decreases from one side toward another side in the in-plane direction in which the direction of the optical axis derived from the liquid crystal compound changes while continuously rotating in the liquid crystal alignment pattern.

[6] The optical element according to any one of [1] to [5],
in which the liquid crystal alignment pattern of the optically-anisotropic layer is a concentric circular pattern having a concentric circular shape where the in-plane direction in which the direction of the optical axis derived from the liquid crystal compound changes while continuously rotating moves from an inside toward an outside.

[7] The optical element according to any one of [1] to [6], comprising:
a plurality optically-anisotropic layers,
in which the optically-anisotropic layers have different directions of twist angles in the thickness direction of the optically-anisotropic layers.

[8] The optical element according to any one of [1] to [7], comprising:
a plurality optically-anisotropic layers,
in which the optically-anisotropic layers have different magnitudes of twist angles in the thickness direction of the optically-anisotropic layers.

[9] The optical element according to [7] or [8], comprising:
a plurality of optically-anisotropic layers,
wherein the optically-anisotropic layers have liquid crystal alignment patterns having the same direction in which a direction of an optical axis derived from the liquid crystal compound continuously rotates in at least one in-plane direction.

[10] The optical element according to any one of [1] to [9],
in which the length of the single period in the liquid crystal alignment pattern is 50 μm or less.

[11] A light guide element comprising:
a light guide plate; and
the optical element according to any one of [1] to [10] that is disposed on a surface of the light guide plate,
in which the optical element is disposed such that the twist angle in the thickness direction of the optically-anisotropic layer gradually changes toward a traveling direction of light in the light guide plate.

[12] A light guide element comprising:
a light guide plate;
a first diffraction element that is disposed on a surface of the light guide plate and diffracts light to be incident into the light guide plate;
a third diffraction element that diffracts light propagated in the light guide plate to be emitted to an outside of the light guide plate; and
a second diffraction element that diffracts light propagated from a position of the first diffraction element in the light guide plate in a direction toward the third diffraction element,
in which at least one of the second diffraction element or the third diffraction element is the optical element according to any one of [1] to [10].

[13] An image display device comprising:
the light guide element according to [11] or [12]; and
a display element that emits an image to the light guide element.

[14] The image display device according to [13],
in which the display element emits circularly polarized light.

In the optical element according to an aspect of the present invention, the refraction angle dependence of the amount of transmitted light in a plane is small, and in a case where light incident into different in-plane regions is refracted at different angles, the brightness of the transmitted light can be increased.

DESCRIPTION OF THE PREFERRED EMBODIMENTS

Figure 1:
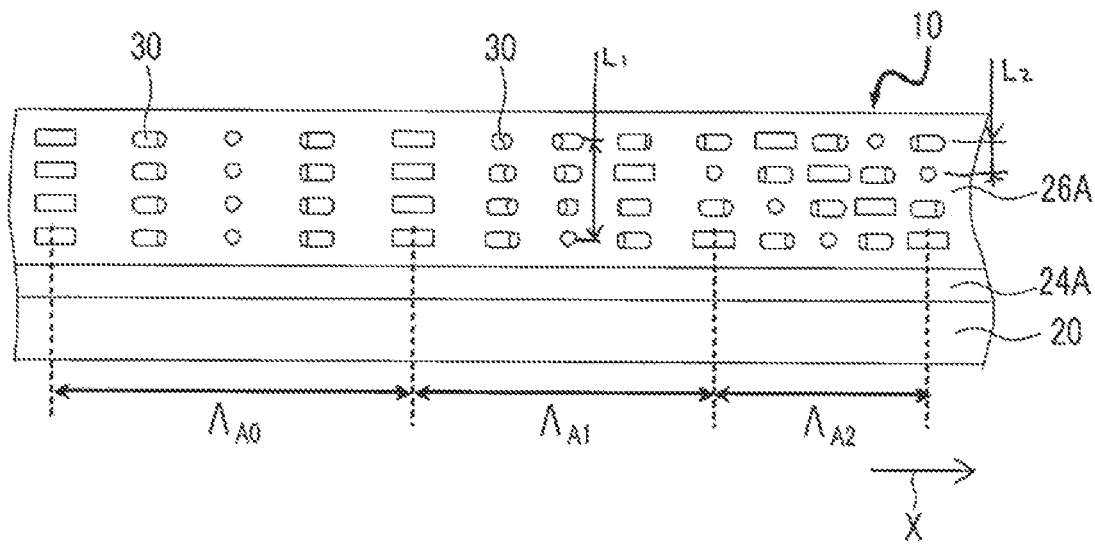
FIG. 1 is a diagram conceptually showing an example of an optical element according to the present invention.

Hereinafter, an optical element according to an embodiment of the present invention will be described in detail based on preferable embodiments shown in the accompanying drawings.

In this specification, numerical ranges represented by "to" include numerical values before and after "to" as lower limit values and upper limit values.

In this specification, "(meth)acrylate" represents "either or both of acrylate and methacrylate".

In this specification, the meaning of "the same" includes a case where an error range is generally allowable in the technical field. In addition, in this specification, the meaning of "all", "entire", or "entire surface" includes not only 100% but also a case where an error range is generally allowable in the technical field, for example, 99% or more, 95% or more, or 90% or more.

In this specification, visible light refers to light which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

In this specification, Re(λ) represents an in-plane retardation at a wavelength k. Unless specified otherwise, the wavelength λ refers to 550 nm.

In this specification, Re(λ) is a value measured at the wavelength λ using AxoScan (manufactured by Axometrics, Inc.). By inputting an average refractive index ((nx+ny+nz)/3) and a thickness (d (μm)) to AxoScan, the following expressions can be calculated.

Slow Axis Direction (°)

Re(λ)=R0(λ)

R0(λ) is expressed as a numerical value calculated by AxoScan and represents Re(λ).

An optical element according to an embodiment of the present invention comprises an optically-anisotropic layer that is formed using a liquid crystal composition including a liquid crystal compound, in which the optically-anisotropic layer has a liquid crystal alignment pattern in which a direction of an optical axis derived from a liquid crystal compound changes while continuously rotating in at least one in-plane direction, and the optically-anisotropic layer has regions in which the optical axis is twisted in a thickness direction of the optically-anisotropic layer and rotates, the regions having different magnitudes of twist angles in the thickness direction in a plane. That is, the thickness direction is a direction perpendicular to a main surface (maximum surface).

Although described in detail below, with the optical element according to the embodiment of the present invention having the above-described configuration, the refraction angle dependence of the amount of transmitted light in a plane is small, and in a case where light incident into different in-plane regions is refracted at different angles, the brightness of the transmitted light can be increased.

[First Aspect of Optical Element]

FIG. 1 is a diagram conceptually showing an example of the optical element according to the embodiment of the present invention.

An optical element 10 in the example shown in the drawing includes a first optically-anisotropic member 12.

As described above, in the optical element according to the embodiment of the present invention, a plurality of optically-anisotropic layers that are formed using a composition including a liquid crystal compound and have a predetermined liquid crystal alignment pattern in which an optical axis derived from the liquid crystal compound rotate are arranged in a thickness direction. The first optically-anisotropic member 12 includes a support 20, an alignment film 24A, and a first optically-anisotropic layer 26A.

In addition, the optical element 10 in the example shown in the drawing includes the support 20 for the optically-anisotropic member. However, the optical element according to the embodiment of the present invention does not necessarily include the support 20 for the optically-anisotropic member.

Alternatively, the support 20 may be peeled off from the above-described configuration such that only the alignment film and the optically-anisotropic layer configure the optical element according to the embodiment of the present invention. In addition, the alignment film may also be peeled off from the above-described configuration such that only the optically-anisotropic layer configures the optical element according to the embodiment of the present invention.

That is, the optical element according to the embodiment of the present invention can use various layer configurations as long as the optically-anisotropic layer has a liquid crystal alignment pattern in which a direction of an optical axis derived from a liquid crystal compound rotates in one in-plane direction, and the optically-anisotropic layer has regions in which the optical axis is twisted in a thickness direction of the optically-anisotropic layer and rotates, the regions having different magnitudes of twist angles of the rotation in a plane. The above-described point can be applied to all the optical elements according to respective aspects of the present invention described below.

<Optically-Anisotropic Member>

In the optical element 10 according to the embodiment of the present invention, the first optically-anisotropic member 12 is provided.

As described above, the first optically-anisotropic member 12 includes the support 20, the alignment film 24A, and the first optically-anisotropic layer 26A.

<<Support>>

In the first optically-anisotropic member 12, the support 20 supports the alignment film 24A and the first optically-anisotropic layer 26A.

In the following description, in a case where it is not necessary to distinguish the alignment film from another alignment film, the alignment films will also be simply referred to as "alignment film". In the following description, in a case where it is not necessary to distinguish the optically-anisotropic layer from another optically-anisotropic layer, the optically-anisotropic layer will also be simply referred to as "optically-anisotropic layer".

As the support 20, various sheet-shaped materials (films or plate-shaped materials) can be used as long as they can support the alignment film and the optically-anisotropic layer.

As the support 20, a transparent support is preferable, and examples thereof include a polyacrylic resin film such as polymethyl methacrylate, a cellulose resin film such as cellulose triacetate, a cycloolefin polymer film (for example, trade name "ARTON", manufactured by JSR Corporation; or trade name "ZEONOR", manufactured by Zeon Corporation), polyethylene terephthalate (PET), polycarbonate, and polyvinyl chloride. The support is not limited to a flexible film and may be a non-flexible substrate such as a glass substrate.

In addition, the support 20 may have a multi-layer structure. Examples of the multi-layer support include a support including: one of the above-described supports having a single-layer structure that is provided as a substrate; and another layer that is provided on a surface of the substrate.

The thickness of the support 20 is not particularly limited and may be appropriately set depending on the use of the optical element 10, a material for forming the support 20, and the like in a range where the alignment film and the optically-anisotropic layer can be supported.

The thickness of the support 20 is preferably 1 to 1000 μm, more preferably 3 to 250 μm, and still more preferably 5 to 150 μm.

<<Alignment Film>>

In the first optically-anisotropic member 12, the alignment film 24A is formed on the surface of the support 20.

The alignment film 24A is an alignment film for aligning the liquid crystal compound 30 to a predetermined liquid crystal alignment pattern during the formation of the first optically-anisotropic layer 26A of the first optically-anisotropic member 12.

Although described below, in the optical element 10 according to the embodiment of the present invention, the optically-anisotropic layer has a liquid crystal alignment pattern in which a direction of an optical axis 30A (refer to FIG. 3) derived from the liquid crystal compound 30 changes while continuously rotating in one in-plane direction (arrow X direction described below). Accordingly, the alignment film of each of the optically-anisotropic members is formed such that the optically-anisotropic layer can form the liquid crystal alignment pattern.

In addition, in the liquid crystal alignment pattern, a length over which the direction of the optical axis 30A rotates by 180° in the in-plane direction in which the direction of the optical axis 30A changes while continuously rotating is set as a single period Λ (a rotation period of the optical axis).

In the following description, "the direction of the optical axis 30A rotates" will also be simply referred to as "the optical axis 30A rotates".

As the alignment film, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film formed by a rubbing treatment can be formed by rubbing a surface of a polymer layer with paper or fabric in a given direction multiple times. As the material used for the alignment film, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In the optical element 10 according to the embodiment of the present invention, for example, the alignment film can be suitably used as a so-called photo-alignment film obtained by irradiating a photo-alignable material with polarized light or non-polarized light. That is, in the optical element 10 according to the embodiment of the present invention, a photo-alignment film that is formed by applying a photo-alignable material to the support 20 is suitably used as the alignment film.

The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking ester described in JP2003-520878A, JP2004-529220A, and JP4162850B; and a photodimerizable compound, in particular, a cinnamate (cinnamic acid) compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking ester, a cinnamate compound, or a chalcone compound is suitability used.

The thickness of the alignment film is not particularly limited. The thickness with which a required alignment function can be obtained may be appropriately set depending on the material for forming the alignment film.

The thickness of the alignment film is preferably 0.01 to 5 μm and more preferably 0.05 to 2 μm.

A method of forming the alignment film is not limited. Any one of various well-known methods corresponding to a material for forming the alignment film can be used. For example, a method including: applying the alignment film to a surface of the support 20; drying the applied alignment film; and exposing the alignment film to laser light to form an alignment pattern can be used.

Figure 7:
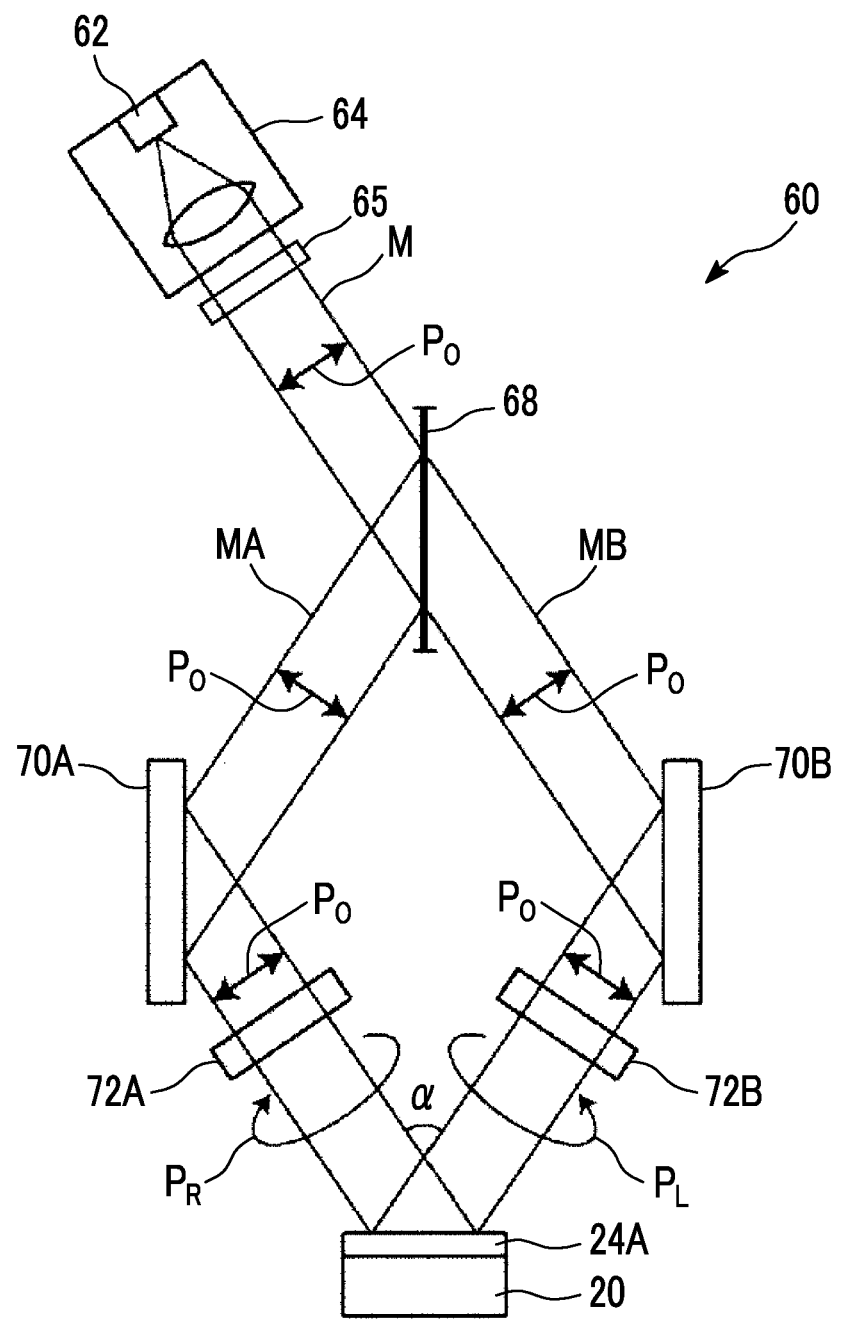
FIG. 7 is a diagram conceptually showing one example of an exposure device that exposes an alignment film of the optical element shown in FIG. 1.

FIG. 7 conceptually shows an example of an exposure device that exposes the alignment film to form an alignment pattern. In the example shown in FIG. 7, for example, the exposure of the alignment film 24A of the first optically-anisotropic member 12 is shown.

An exposure device 60 shown in FIG. 7 includes: a light source 64 including a laser 62; an λ/2 plate 65 that changes a polarization direction of laser light M emitted from the laser 62; a beam splitter 68 that splits the laser light M emitted from the laser 62 into two beams MA and MB; mirrors 70A and 70B that are disposed on optical paths of the splitted two beams MA and MB; and λ/4 plates 72A and 72B.

Although not shown in the drawing, the light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 20 including the alignment film 24A on which the alignment pattern is not yet formed is disposed at an exposed portion, the two beams MA and MB intersect and interfere each other on the alignment film 24A, and the alignment film 24A is irradiated with and exposed to the interference light.

Due to the interference at this time, the polarization state of light with which the alignment film 24A is irradiated periodically changes according to interference fringes. As a result, in the alignment film 24A, an alignment pattern in which the alignment state periodically changes can be obtained. That is, an alignment film (hereinafter, also referred to as "patterned alignment film") having an alignment pattern in which the alignment state changes periodically is obtained.

In the exposure device 60, by changing an intersection angle α between the two beams MA and MB, the period of the alignment pattern can be adjusted. That is, by adjusting the intersection angle α in the exposure device 60, in the crystal alignment pattern in which the optical axis 30A derived from the liquid crystal compound 30 continuously rotates in the in-plane direction, the length (single period Λ) of the single period over which the optical axis 30A rotates by 180° in the in-plane direction in which the optical axis 30A rotates can be adjusted.

By forming the optically-anisotropic layer on the patterned alignment film having the alignment pattern in which the alignment state periodically changes, as described below, the first optically-anisotropic layer 26A having the liquid crystal alignment pattern in which the optical axis 30A derived from the liquid crystal compound 30 continuously rotates in the in-plane direction can be formed.

In addition, by rotating the optical axes of the λ/4 plates 72A and 72B by 90°, respectively, the rotation direction of the optical axis 30A can be reversed.

As described above, the patterned alignment film has a liquid crystal alignment pattern in which the liquid crystal compound is aligned such that the direction of the optical axis of the liquid crystal compound in the optically-anisotropic layer formed on the patterned alignment film changes while continuously rotating in at least one in-plane direction. In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the in-plane direction.

In the optical element according to the embodiment of the present invention, the alignment film is provided as a preferable aspect and is not an essential component.

For example, the following configuration can also be adopted, in which, by forming the alignment pattern on the support 20 using a method of rubbing the support 20, a method of processing the support 20 with laser light or the like, or the like, the first optically-anisotropic layer 26A or the like has the liquid crystal alignment pattern in which the direction of the optical axis 30A derived from the liquid crystal compound 30 changes while continuously rotating in at least one in-plane direction.

<<Optically-Anisotropic Layer>>

In the first optically-anisotropic member 12, the first optically-anisotropic layer 26A is formed on the surface of the alignment film 24A.

Figure 2:
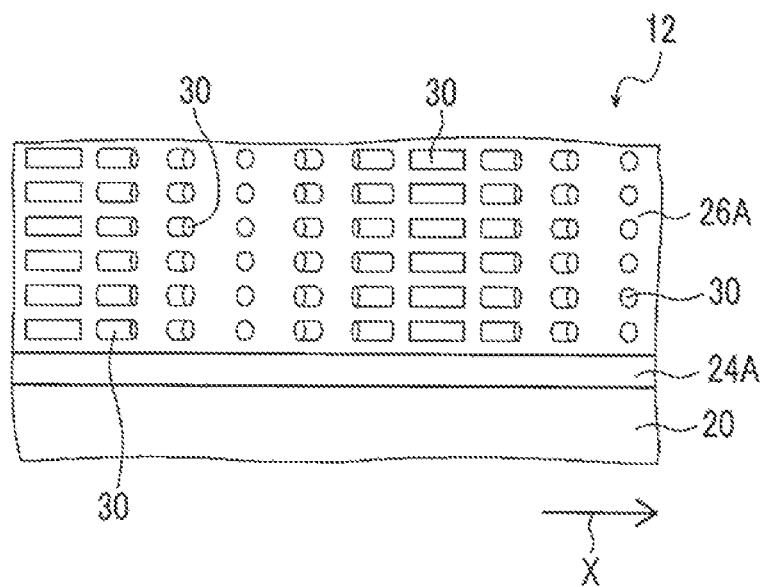
FIG. 2 is a conceptually showing an optically-anisotropic layer of the optical element shown in FIG. 1.
Figure 4:
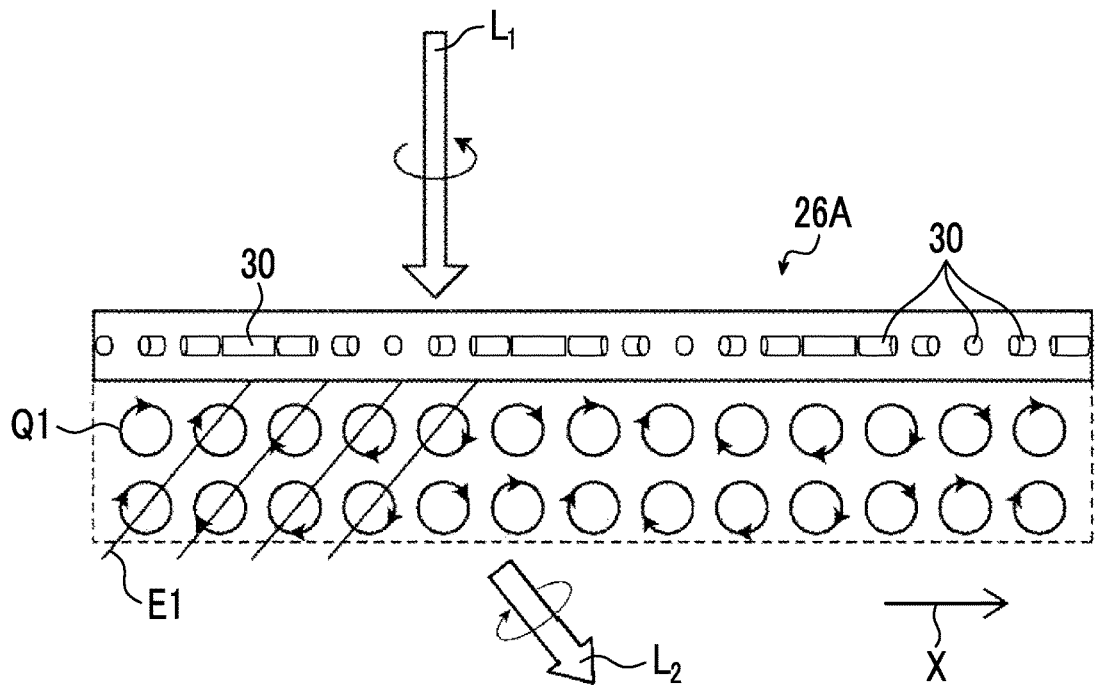
FIG. 4 is a conceptual diagram showing the action of the optically-anisotropic layer of the optical element shown in FIG. 1.
Figure 5:
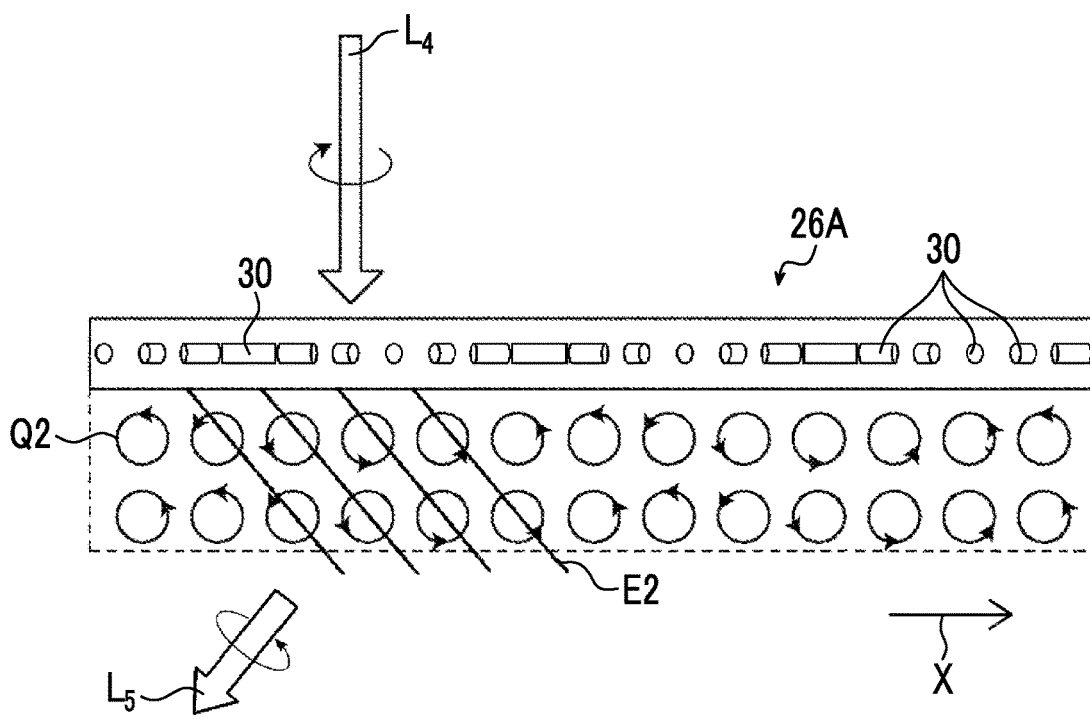
FIG. 5 is a conceptual diagram showing the action of the optically-anisotropic layer of the optical element shown in FIG. 1.

In FIGS. 4 and 5 described below, in order to simplify the drawing and to clarify the configuration of the optical element 10, only the liquid crystal compound 30 (liquid crystal compound molecules) on the surface of the alignment film in the first optically-anisotropic layer 26A is shown. However, as conceptually shown in FIG. 2 showing the first optically-anisotropic layer 26A, the first optically-anisotropic layer 26A has a structure in which the aligned liquid crystal compounds 30 are laminated as in an optically-anisotropic layer that is formed using a composition including a typical liquid crystal compound.

As described above, in the optical element 10 according to the embodiment of the present invention, the optically-anisotropic layer (the first optically-anisotropic layer 26A) is formed using the composition including the liquid crystal compound.

In a case where an in-plane retardation value is set as λ/2, the optically-anisotropic layer has a function of a general λ/2 plate, that is, a function of imparting a phase difference of a half wavelength, that is, 180° to two linearly polarized light components that are included in light incident into the optically-anisotropic layer and are perpendicular to each other.

Here, since the liquid crystal compound rotates to be aligned in a plane direction, the optically-anisotropic layer diffracts (refracts) incident circularly polarized light to be transmitted in a direction in which the direction of the optical axis continuously rotates. At this time, the diffraction direction varies depending on the turning direction of incident circularly polarized light.

That is, the optically-anisotropic layer allows transmission of circularly polarized light and diffracts this transmitted light.

In addition, the optically-anisotropic layer changes a turning direction of the transmitted circularly polarized light into an opposite direction.

The optically-anisotropic layer has the liquid crystal alignment pattern in which the direction of the optical axis derived from the liquid crystal compound changes while continuously rotating in one direction indicated by arrow X in a plane of the optically-anisotropic layer.

The optical axis 30A derived from the liquid crystal compound 30 is an axis having the highest refractive index in the liquid crystal compound 30, that is, a so-called slow axis. For example, in a case where the liquid crystal compound 30 is a rod-shaped liquid crystal compound, the optical axis 30A is along a rod-shaped major axis direction.

In the following description, "one direction indicated by arrow X" will also be simply referred to as "arrow X direction". In addition, in the following description, the optical axis 30A derived from the liquid crystal compound 30 will also be referred to as "the optical axis 30A of the liquid crystal compound 30" or "the optical axis 30A".

In each of the optically-anisotropic layer, the liquid crystal compound 30 is two-dimensionally aligned in a plane parallel to the arrow X direction and in a Y direction perpendicular to the arrow X direction. In FIGS. 1 and 2 and FIGS. 4 to 6 described below, the Y direction is a direction perpendicular to the paper plane.

Figure 3:
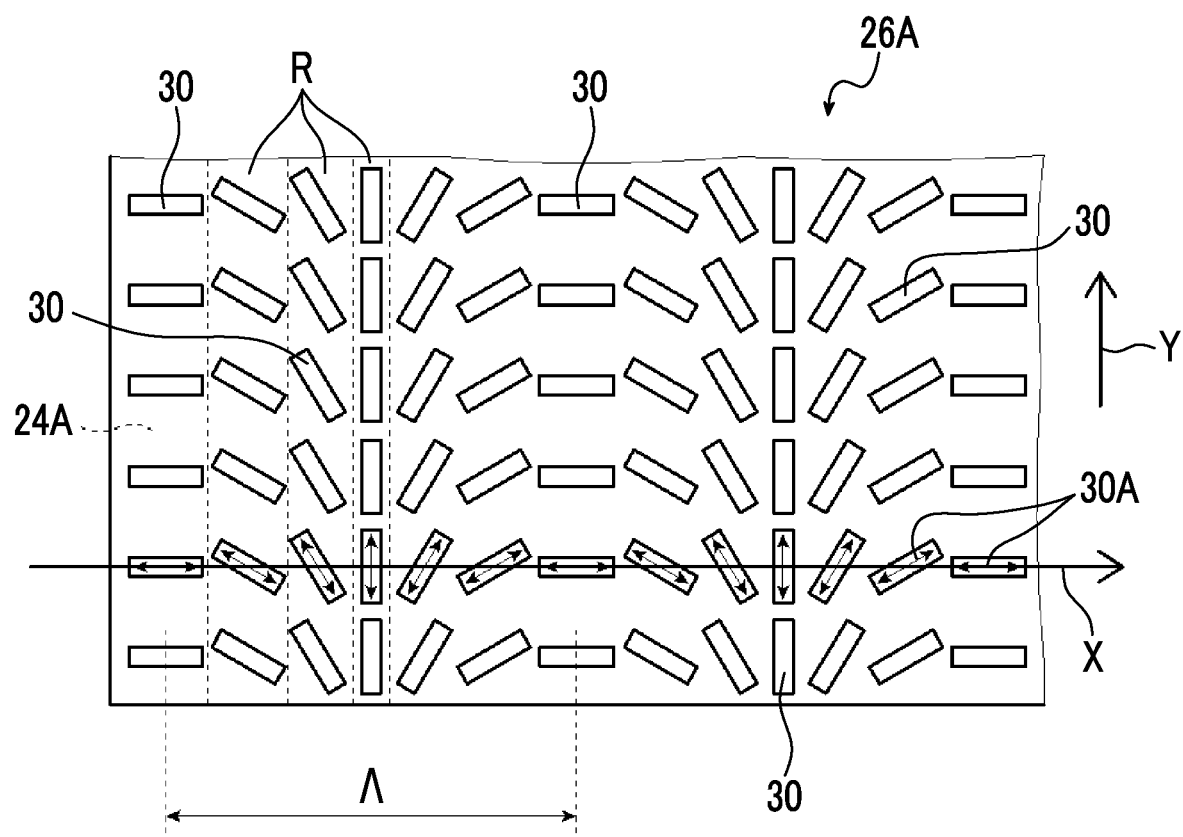
FIG. 3 is a plan view showing the optically-anisotropic layer of the optical element shown in FIG. 1.

FIG. 3 conceptually shows a plan view of the first optically-anisotropic layer 26A.

The plan view is a view in a case where the optical element 10 is seen from the top in FIG. 1, that is, a view in a case where the optical element 10 is seen from a thickness direction (laminating direction of the respective layers (films)). In other words, the plan view is a view in a case where the first optically-anisotropic layer 26A is seen from a direction perpendicular to a main surface.

In addition, in FIG. 3, in order to clarify the configuration of the optical element 10 according to the embodiment of the present invention, only the liquid crystal compound 30 on the surface of the alignment film 24A is shown. However, in the thickness direction, as shown in FIG. 2, the first optically-anisotropic layer 26A has the structure in which the liquid crystal compound 30 is laminated on the surface of the alignment film 24A as described above.

In FIG. 3, a part in a plane of the first optically-anisotropic layer 26A will be described as a representative example. However, basically, the optically-anisotropic layer described below also has the same configuration and the same effects as those of the first optically-anisotropic layer 26A, except that the lengths (single periods Λ) of the single periods of the liquid crystal alignment patterns described below are different from each other.

The first optically-anisotropic layer 26A has the liquid crystal alignment pattern in which the direction of the optical axis 30A derived from the liquid crystal compound 30 changes while continuously rotating in the arrow X direction in a plane of the first optically-anisotropic layer 26A.

Specifically, "the direction of the optical axis 30A of the liquid crystal compound 30 changes while continuously rotating in the arrow X direction (the predetermined in-plane direction)" represents that an angle between the optical axis 30A of the liquid crystal compound 30, which is arranged in the arrow X direction, and the arrow X direction varies depending on positions in the arrow X direction, and the angle between the optical axis 30A and the arrow X direction sequentially changes from θ to θ+180° or θ-180° in the arrow X direction.

A difference between the angles of the optical axes 30A of the liquid crystal compound 30 adjacent to each other in the arrow X direction is preferably 45 or less, more preferably 15° or less, and still more preferably less than 15°.

On the other hand, regarding the liquid crystal compound 30 forming the first optically-anisotropic layer 26A, the liquid crystal compounds 30 having the same direction of the optical axes 30A are arranged at regular intervals in the Y direction perpendicular to the arrow X direction, that is, the Y direction perpendicular to the in-plane direction in which the optical axis 30A continuously rotates.

In other words, regarding the liquid crystal compound 30 forming the first optically-anisotropic layer 26A, in the liquid crystal compounds 30 arranged in the Y direction, angles between the directions of the optical axes 30A and the arrow X direction are the same.

In the optical element 10 according to the embodiment of the present invention, in the liquid crystal alignment pattern of the liquid crystal compound 30, the length (distance) over which the optical axis 30A of the liquid crystal compound 30 rotates by 180° in the arrow X direction in which the direction of the optical axis 30A changes while continuously rotating in a plane is the length Λ of the single period in the liquid crystal alignment pattern. In other words, the length of the single period in the liquid crystal alignment pattern is defined as the distance between θ and θ+180° that is a range of the angle between the optical axis 30A of the liquid crystal compound 30 and the arrow X direction.

That is, a distance between centers of two liquid crystal compounds 30 in the arrow X direction is the length of the single period, the two liquid crystal compounds having the same angle in the arrow X direction. Specifically, as shown in FIG. 3, a distance of centers of two liquid crystal compounds 30 in which the arrow X direction and the direction of the optical axis 30A match each other in the arrow X direction is the length Λ of the single period. In the following description, the length Λ of the single period will also be referred to as "single period Λ".

In the optical element 10 according to the embodiment of the present invention, in the liquid crystal alignment pattern of the optically-anisotropic layer, the single period Λ is repeated in the arrow X direction, that is, in the in-plane direction in which the direction of the optical axis 30A changes while continuously rotating.

As described above, in the liquid crystal compounds arranged in the Y direction in the optically-anisotropic layer, the angles between the optical axes 30A and the arrow X direction (the in-plane direction in which the direction of the optical axis of the liquid crystal compound 30 rotates) are the same. Regions where the liquid crystal compounds 30 in which the angles between the optical axes 30A and the arrow X direction are the same are arranged in the Y direction will be referred to as "regions R".

In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the liquid crystal compound 30 in the direction of the optical axis 30A and a refractive index of the liquid crystal compound 30 in a direction perpendicular to the optical axis 30A in a plane of the region R. That is, the difference Δn in refractive index is the same as the difference in refractive index of the liquid crystal compound.

In a case where circularly polarized light is incident into the above-described optically-anisotropic layer (the first optically-anisotropic layer 26A), the light is refracted such that the direction of the circularly polarized light is converted.

This action is conceptually shown in FIG. 4 using the first optically-anisotropic layer 26A. In the first optically-anisotropic layer 26A, the value of the product of the difference in refractive index of the liquid crystal compound and the thickness of the optically-anisotropic layer is λ/2.

As shown in FIG. 4, in a case where the value of the product of the difference in refractive index of the liquid crystal compound and the thickness of the optically-anisotropic layer in the first optically-anisotropic layer 26A is λ/2 and incidence light $L_1$ as left circularly polarized light is incident into the first optically-anisotropic layer 26A, the incidence light $L_1$ transmits through the first optically-anisotropic layer 26A to be imparted with a phase difference of 180° such that the transmitted light $L_2$ is converted into right circularly polarized light.

In addition, in a case where the incidence light $L_1$ transmits through the first optically-anisotropic layer 26A, an absolute phase thereof changes depending on the direction of the optical axis 30A of each of the liquid crystal compounds 30. At this time, the direction of the optical axis 30A changes while rotating in the arrow X direction. Therefore, the amount of change in the absolute phase of the incidence light $L_1$ varies depending on the direction of the optical axis 30A. Further, the liquid crystal alignment pattern that is formed in the first optically-anisotropic layer 26A is a pattern that is periodic in the arrow X direction. Therefore, as shown in FIG. 4, the incidence light $L_1$ transmitted through the first optically-anisotropic layer 26A is imparted with an absolute phase Q1 that is periodic in the arrow X direction corresponding to the direction of each of the optical axes 30A. As a result, an equiphase surface E1 that is tilted in a direction opposite to the arrow X direction is formed.

Therefore, the transmitted light $L_2$ is refracted to be tilted in a direction perpendicular to the equiphase surface E1 and travels in a direction different from a traveling direction of the incidence light $L_1$. This way, the incidence light $L_1$ of the left circularly polarized light $P_L$ is converted into the transmitted light $L_2$ of right circularly polarized light that is tilted by a predetermined angle in the arrow X direction with respect to an incidence direction.

On the other hand, as conceptually shown in FIG. 5, in a case where the value of the product of the difference in refractive index of the liquid crystal compound and the thickness of the optically-anisotropic layer in the first optically-anisotropic layer 26A is λ/2 and incidence light $L_4$ as right circularly polarized light is incident into the first optically-anisotropic layer 26A, the incidence light $L_4$ transmits through the first optically-anisotropic layer 26A to be imparted with a phase difference of 180° and is converted into transmitted light $L_5$ of left circularly polarized light.

In addition, in a case where the incidence light $L_4$ transmits through the first optically-anisotropic layer 26A, an absolute phase thereof changes depending on the direction of the optical axis 30A of each of the liquid crystal compounds 30. At this time, the direction of the optical axis 30A changes while rotating in the arrow X direction. Therefore, the amount of change in the absolute phase of the incidence light $L_4$ varies depending on the direction of the optical axis 30A. Further, the liquid crystal alignment pattern that is formed in the first optically-anisotropic layer 26A is a pattern that is periodic in the arrow X direction. Therefore, as shown in FIG. 5, the incidence light $L_4$ transmitted through the first optically-anisotropic layer 26A is imparted with an absolute phase Q2 that is periodic in the arrow X direction corresponding to the direction of each of the optical axes 30A.

Here, the incidence light $L_4$ is right circularly polarized light. Therefore, the absolute phase Q2 that is periodic in the arrow X direction corresponding to the direction of the optical axis 30A is opposite to the incidence light $L_1$ as left circularly polarized light. As a result, in the incidence light $L_4$, an equiphase surface E2 that is tilted in the arrow X direction opposite to that of the incidence light $L_1$ is formed.

Therefore, the incidence light $L_4$ is refracted to be tilted in a direction perpendicular to the equiphase surface E2 and travels in a direction different from a traveling direction of the incidence light $L_4$. This way, the incidence light $L_4$ is converted into the transmitted light $L_5$ of left circularly polarized light that is tilted by a predetermined angle in a direction opposite to the arrow X direction with respect to an incidence direction.

In the first optically-anisotropic layer 26A, it is preferable that the in-plane retardation value of the plurality of regions R is a half wavelength. It is preferable that an in-plane retardation $Re(550) = \Delta n_{550} \times d$ of the plurality of regions R of the first optically-anisotropic layer 26A with respect to the incidence light having a wavelength of 550 nm is in a range defined by the following Expression (1). Here, $\Delta n_{550}$ represents a difference in refractive index generated by refractive index anisotropy of the region R in a case where the wavelength of incidence light is 550 nm, and d represents the thickness of the first optically-anisotropic layer 26A.

$$200 \text{ nm} \leq \Delta n_{550} \times d \leq 350 \text{ nm} \quad (1).$$

That is, in a case where the in-plane retardation $Re(550) = \Delta n_{550} \times d$ of the plurality of regions R of the first optically-anisotropic layer 26A satisfies Expression (1), a sufficient amount of a circularly polarized light component in light incident into the first optically-anisotropic layer 26A can be converted into circularly polarized light that travels in a direction tilted in a forward direction or reverse direction with respect to the arrow X direction. It is more preferable that the in-plane retardation $Re(550) = \Delta n_{550} \times d$ satisfies $225 \text{ nm} \leq \Delta n_{550} \times d \leq 340 \text{ nm}$, and it is still more preferable that the in-plane retardation $Re(550) = \Delta n_{550} \times d$ satisfies $250 \text{ nm} \leq \Delta n_{550} \times d \leq 330 \text{ nm}$.

Expression (1) is a range with respect to incidence light having a wavelength of 550 nm. However, an in-plane retardation $Re(\lambda) = \Delta n_\lambda \times d$ of the plurality of regions R of the optically-anisotropic layer with respect to incidence light having a wavelength of $\lambda$ nm is preferably in a range defined by the following Expression (1-2) and can be appropriately set.

$$0.7 \times (\lambda/2) \text{nm} \leq \Delta n_\lambda \times d \leq 1.3 \times (\lambda/2) \text{nm} \quad (1-2)$$

In addition, the value of the in-plane retardation of the plurality of regions R of the first optically-anisotropic layer 26A in a range outside the range of Expression (1) can also be used. Specifically, by satisfying $\Delta n_{550} \times d < 200$ nm or $350 \text{ nm} < \Delta n_{550} \times d$, the light can be classified into light that travels in the same direction as a traveling direction of the incidence light and light that travels in a direction different from a traveling direction of the incidence light. In a case where $\Delta n_{550} \times d$ approaches 0 nm or 550 nm, the amount of the light component that travels in the same direction as a traveling direction of the incidence light increases, and the amount of the light component that travels in a direction different from a traveling direction of the incidence light decreases.

Further, it is preferable that an in-plane retardation $Re(450) = \Delta n_{450} \times d$ of each of the plurality of regions R of the first optically-anisotropic layer 26A with respect to incidence light having a wavelength of 450 nm and an in-plane retardation $Re(550) = \Delta n_{550} \times d$ of each of the plurality of regions R of the first optically-anisotropic layer 26A with respect to incidence light having a wavelength of 550 nm satisfy the following Expression (2). Here, $\Delta n_{450}$ represents a difference in refractive index generated by refractive index anisotropy of the region R in a case where the wavelength of incidence light is 450 nm.

$$(\Delta n_{450} \times d)/(\Delta n_{550} \times d) < 1.0 \quad (2)$$

Expression (2) represents that the liquid crystal compound 30 included in the first optically-anisotropic layer 26A has reverse dispersibility. That is, by satisfying Expression (2), the first optically-anisotropic layer 26A can correspond to incidence light having a wide range of wavelength.

Here, by changing the single period Λ of the liquid crystal alignment pattern formed in the first optically-anisotropic layer 26A, refraction angles of the transmitted light components $L_2$ and $L_5$ can be adjusted. Specifically, as the single period Λ of the liquid crystal alignment pattern decreases, light components transmitted through the liquid crystal compounds 30 adjacent to each other more strongly interfere with each other. Therefore, the transmitted light components $L_2$ and $L_5$ can be more largely refracted.

Further, by reversing the rotation direction of the optical axis 30A of the liquid crystal compound 30 that rotates in the arrow X direction, the refraction direction of transmitted light can be reversed.

Further the first optically-anisotropic layer 26 has regions in which the optical axis is twisted in a thickness direction of the optically-anisotropic layer and rotates, the regions having different twist angles in the thickness direction. This point will be described below.

The optically-anisotropic layer is formed of a cured layer of a liquid crystal composition including a rod-shaped liquid crystal compound or a disk-shaped liquid crystal compound, and has a liquid crystal alignment pattern in which an optical axis of the rod-shaped liquid crystal compound or an optical axis of the disk-shaped liquid crystal compound is aligned as described above.

By forming an alignment film on the support 20, applying the liquid crystal composition to the alignment film, and curing the applied liquid crystal composition, the optically-anisotropic layer consisting of the cured layer of the liquid crystal composition can be obtained. Although the optically-anisotropic layer functions as a so-called λ/2 plate, the present invention also includes an aspect where a laminate including the support 20 and the alignment film that are integrated functions as a so-called λ/2 plate.

In addition, the liquid crystal composition for forming the optically-anisotropic layer includes a rod-shaped liquid crystal compound or a disk-shaped liquid crystal compound and may further include other components such as a leveling agent, an alignment controller, a polymerization initiator, or an alignment assistant.

In addition, it is preferable that the optically-anisotropic layer has a wide range for the wavelength of incidence light and is formed of a liquid crystal material having a reverse birefringence dispersion. In addition, it is also preferable that the optically-anisotropic layer can be made to have a substantially wide range for the wavelength of incidence light by imparting a torsion component to the liquid crystal composition or by laminating different phase difference layers. For example, in the optically-anisotropic layer, a method of realizing a λ/2 plate having a wide-range pattern by laminating two liquid crystal layers having different twisted directions is disclosed in, for example, JP2014-089476A and can be preferably used in the present invention.

—Rod-Shaped Liquid Crystal Compound—

As the rod-shaped liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. As the rod-shaped liquid crystal compound, not only the above-described low molecular weight liquid crystal molecules but also high molecular weight liquid crystal molecules can be used.

It is preferable that the alignment of the rod-shaped liquid crystal compound is immobilized by polymerization. Examples of the polymerizable rod-shaped liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-064627A. Further, as the rod-shaped liquid crystal compound, for example, compounds described in JP1999-513019A (JP-H11-513019A) and JP2007-279688A can be preferably used.

—Disk-Shaped Liquid Crystal Compound—

As the disk-shaped liquid crystal compound, for example, compounds described in JP2007-108732A and JP2010-244038A can be preferably used.

Figure 10:
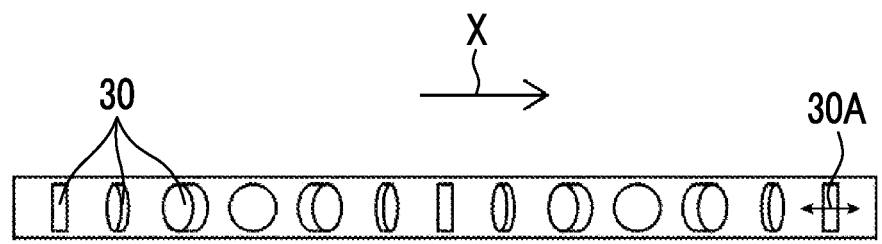
FIG. 10 is a diagram conceptually showing another example of the optically-anisotropic layer of the optical element according to the present invention.

In a case where the disk-shaped liquid crystal compound is used in the optically-anisotropic layer, the liquid crystal compound 30 rises in the thickness direction in the optically-anisotropic layer, and the optical axis 30A derived from the liquid crystal compound is defined as an axis perpendicular to a disk plane, that is so-called, a fast axis (refer to FIG. 10).

—Photoreactive Chiral Agent—

The photoreactive chiral agent according to the embodiment of the present invention is formed of, for example, a compound represented by the following Formula (I) and has properties capable of controlling an aligned structure of the liquid crystal compound and changing a helical pitch of the liquid crystal compound, that is, a helical twisting power (HTP) of a helical structure during light irradiation. That is, the photoreactive chiral agent is a compound that causes a helical twisting power of a helical structure derived from a liquid crystal compound, preferably, a nematic liquid crystal compound to change during light irradiation (ultraviolet light to visible light to infrared light), and includes a portion including a chiral portion and a portion in which a structural change occurs during light irradiation as necessary portions (molecular structural units). However, the photoreactive chiral agent represented by the following Formula (I) can significantly change the HTP of liquid crystal molecules.

The above-described HTP represents the helical twisting power of a helical structure of liquid crystal, that is, HTP=1/(Pitch×Chiral Agent Concentration [Mass Fraction]). For example, the HTP can be obtained by measuring a helical pitch (single period of the helical structure; m) of a liquid crystal molecule at a given temperature and converting the measured value into a value [$\mu m^{-1}$] in terms of the concentration of the chiral agent. In a case where a selective reflection color is formed by the photoreactive chiral agent depending on the illuminance of light, a change ratio in HTP (HTP before irradiation/HTP after irradiation) is preferably 1.5 or higher and more preferably 2.5 or higher in a case where the HTP decreases after irradiation, and is preferably 0.7 or lower and more preferably 0.4 or lower in a case where the HTP increases after irradiation.

Next, the compound represented by Formula (I) will be described.

Formula (I)

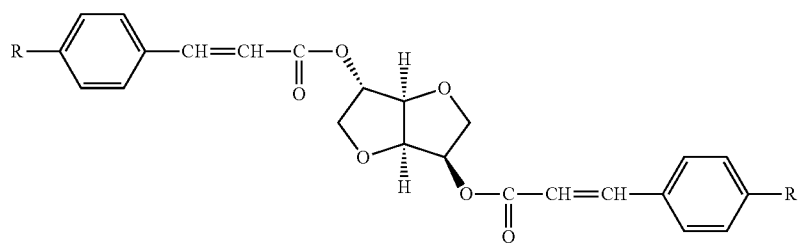

In the formula, R represents a hydrogen atom, an alkoxy group having 1 to 15 carbon atom, an acryloyloxyalkyloxy group having 3 to 15 carbon atoms in total, or a methacryloyloxyalkyloxy group having 4 to 15 carbon atoms in total.

Examples of the alkoxy group having 1 to 15 carbon atoms include a methoxy group, an ethoxy group, a propoxy group, a butoxy group, a hexyloxy group, and a dodecyloxy group. In particular, an alkoxy group having 1 to 12 carbon atoms is preferable, and an alkoxy group having 1 to 8 carbon atoms is more preferable.

Examples of the acryloyloxyalkyloxy group having 3 to 15 carbon atoms in total include an acryloyloxyethyloxy group, an acryloyloxybutyloxy group, and an acryloyloxydecyloxy group. In particular, an acryloyloxyalkyloxy group having 5 to 13 carbon atoms is preferable, and an acryloyloxyalkyloxy group having 5 to 11 carbon atoms is more preferable.

Examples of the methacryloyloxyalkyloxy group having 4 to 15 carbon atoms in total include a methacryloyloxyethyloxy group, a methacryloyloxybutyloxy group, and a methacryloyloxydecyloxy group. In particular, a methacryloyloxyalkyloxy group having 6 to 14 carbon atoms is preferable, and a methacryloyloxyalkyloxy group having 6 to 12 carbon atoms is more preferable.

The molecular weight of the photoreactive chiral agent represented by Formula (I) is preferably 300 or higher. In addition, it is preferable that the solubility in the liquid crystal compound described below is high, and it is more preferable that the solubility parameter SP value is close to that of the liquid crystal compound.

Hereinafter, specific examples (exemplary compounds (1) to (15)) of the compound represented by Formula (I) will be shown, but the present invention is not limited thereto.

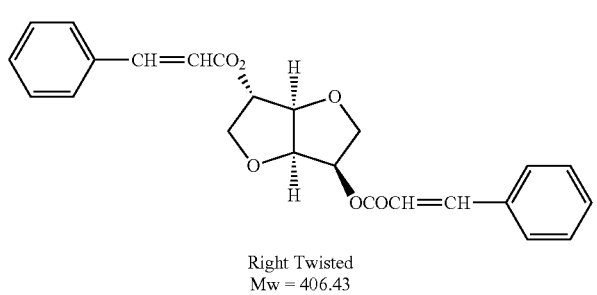

(1)

Right Twisted
Mw = 406.43

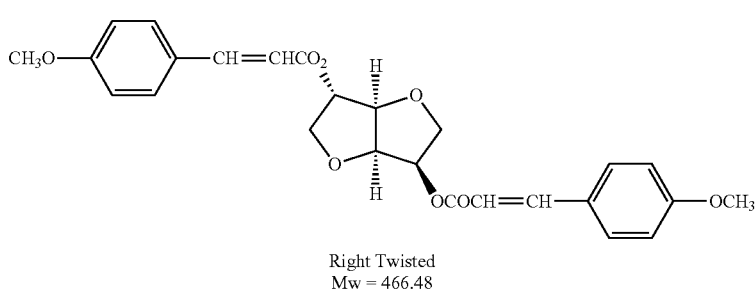

(2)

Right Twisted
Mw = 466.48

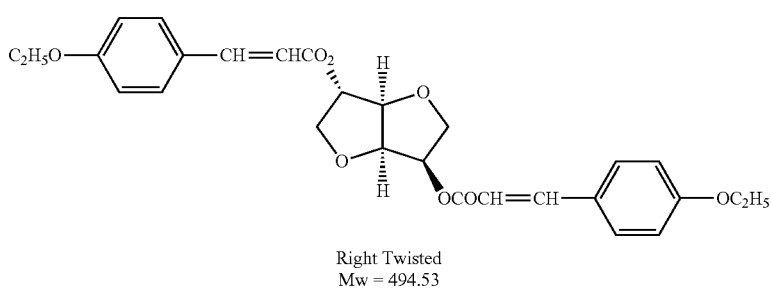

(3)

Right Twisted
Mw = 494.53

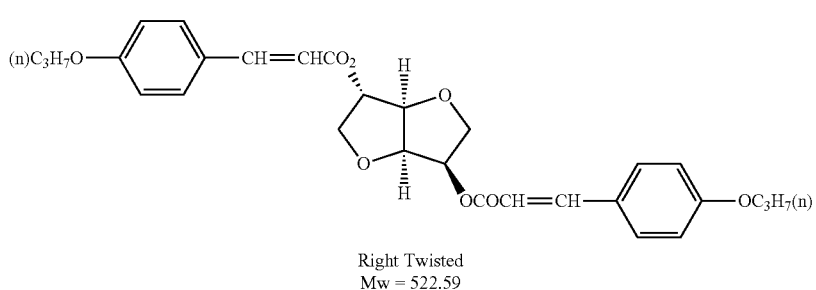

(4)

Right Twisted
Mw = 522.59

-continued
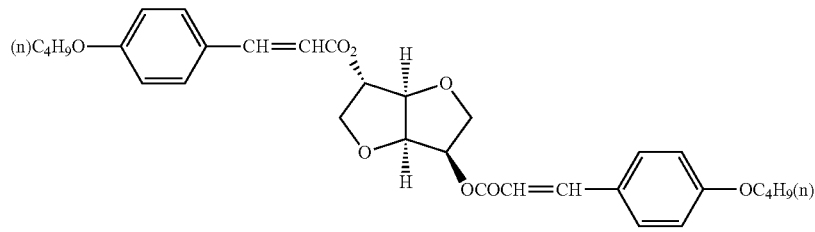
(5)
Right Twisted
Mw = 550.64
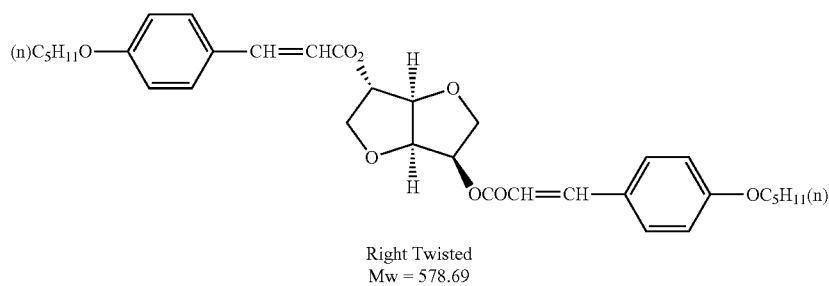
(6)
Right Twisted
Mw = 578.69
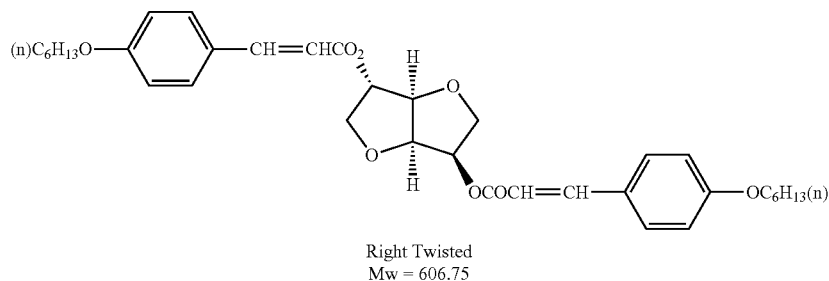
(7)
Right Twisted
Mw = 606.75
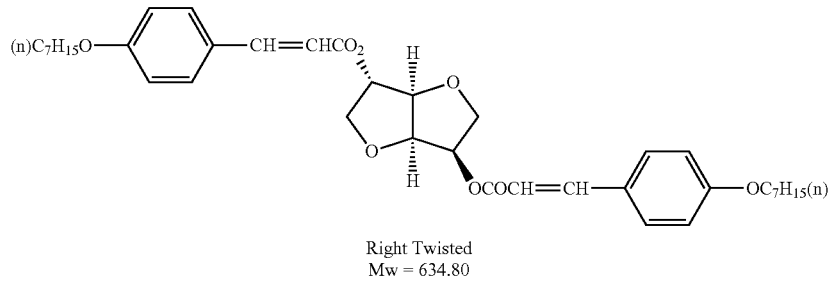
(8)
Right Twisted
Mw = 634.80
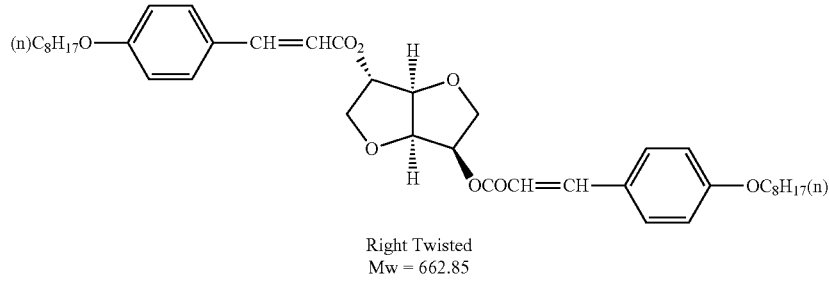
(9)
Right Twisted
Mw = 662.85

(10)
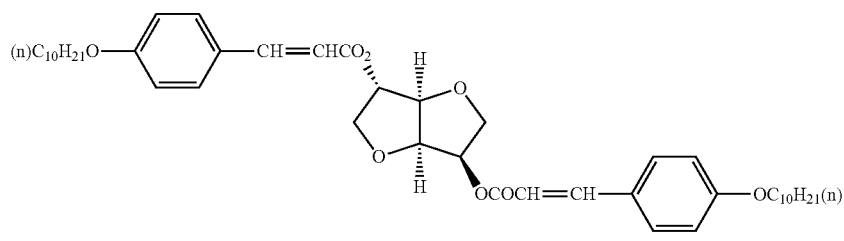
Right Twisted
Mw = 718.96
(11)
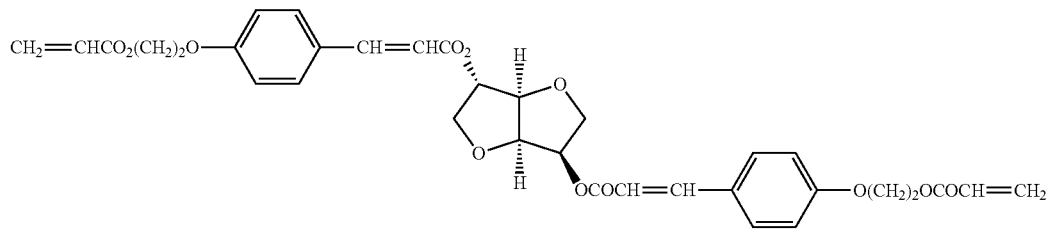
(12)
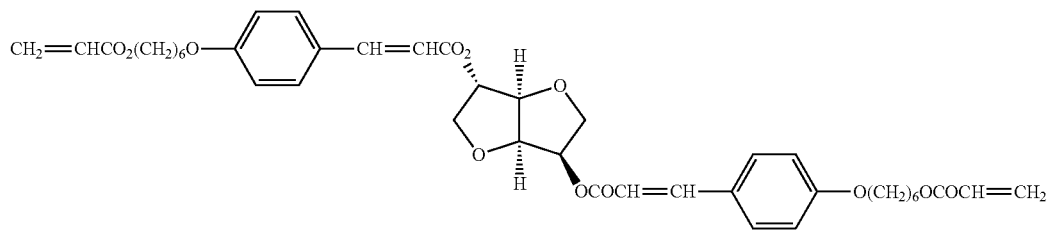
(13)
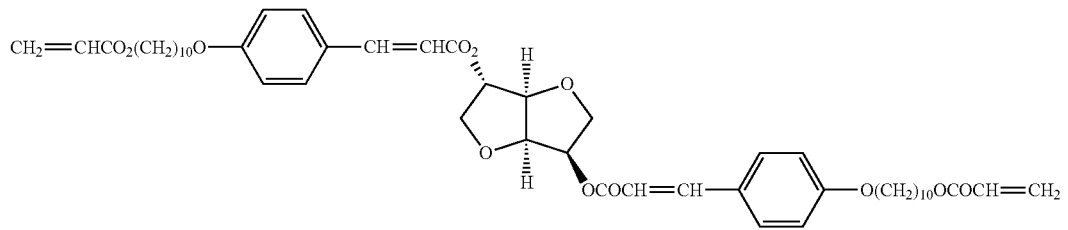
(14)
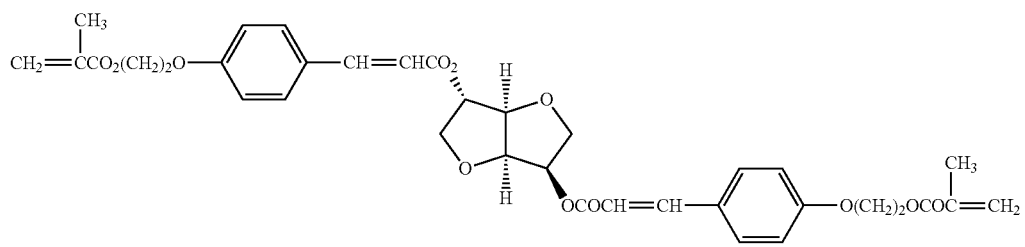
(15)
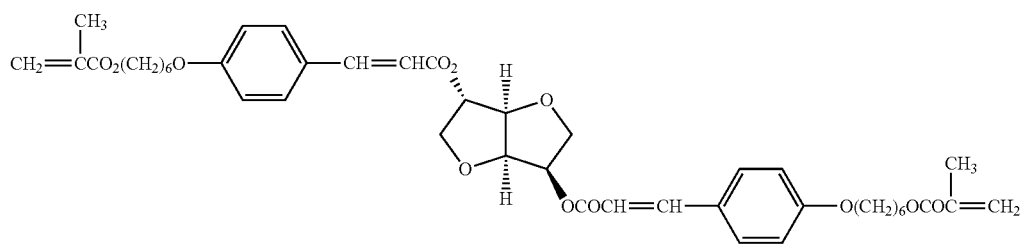
In the present invention, as the photoreactive chiral agent, for example, a photoreactive optically active compound represented by the following Formula (II) is also used.

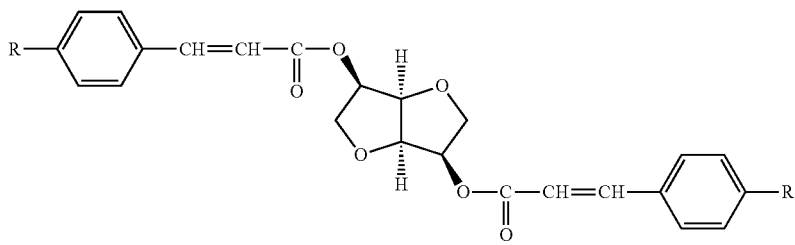

Formula (II)

In the formula, R represents a hydrogen atom, an alkoxy group having 1 to 15 carbon atom, an acryloyloxyalkyloxy group having 3 to 15 carbon atoms in total, or a methacryloyloxyalkyloxy group having 4 to 15 carbon atoms in total.

Examples of the alkoxy group having 1 to 15 carbon atoms include a methoxy group, an ethoxy group, a propoxy group, a butoxy group, a hexyloxy group, an octyloxy group, and a dodecyloxy group. In particular, an alkoxy group having 1 to 10 carbon atoms is preferable, and an alkoxy group having 1 to 8 carbon atoms is more preferable.

Examples of the acryloyloxyalkyloxy group having 3 to 15 carbon atoms in total include an acryloyloxy group, an acryloyloxyethyloxy group, an acryloyloxypropyloxy group, an acryloyloxyhexyloxy group, an acryloyloxybutyloxy group, and an acryloyloxydecyloxy group. In particular, an acryloyloxyalkyloxy group having 3 to 13 carbon atoms is preferable, and an acryloyloxyalkyloxy group having 3 to 11 carbon atoms is more preferable.

Examples of the methacryloyloxyalkyloxy group having 4 to 15 carbon atoms in total include a methacryloyloxy group, a methacryloyloxyethyloxy group, and a methacryloyloxyhexyloxy group. In particular, a methacryloyloxyalkyloxy group having 4 to 14 carbon atoms is preferable, and a methacryloyloxyalkyloxy group having 4 to 12 carbon atoms is more preferable.

The molecular weight of the photoreactive optically active compound represented by Formula (II) is preferably 300 or higher. In addition, it is preferable that the solubility in the liquid crystal compound described below is high, and it is more preferable that the solubility parameter SP value is close to that of the liquid crystal compound.

Hereinafter, specific examples (exemplary compounds (21) to (32)) of the photoreactive optically active compound represented by Formula (II) will be shown, but the present invention is not limited thereto.

(21)

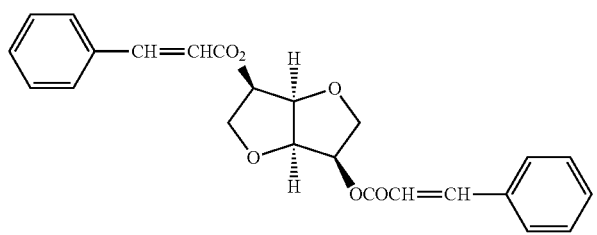

Left Twisted
Mw = 406.43

(22)

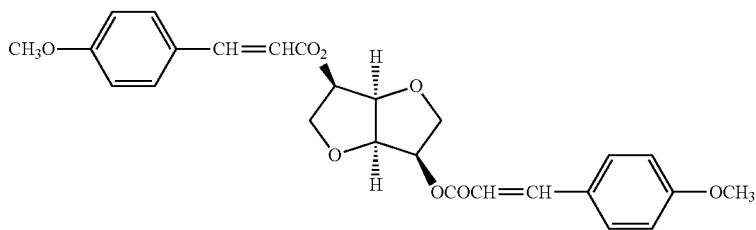

Left Twisted
Mw = 466.48

(23)
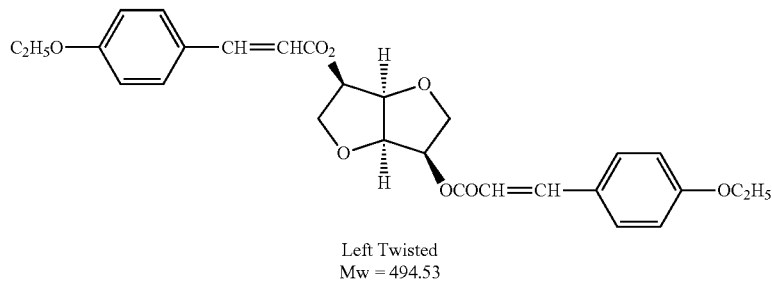
Left Twisted
Mw = 494.53
(24)
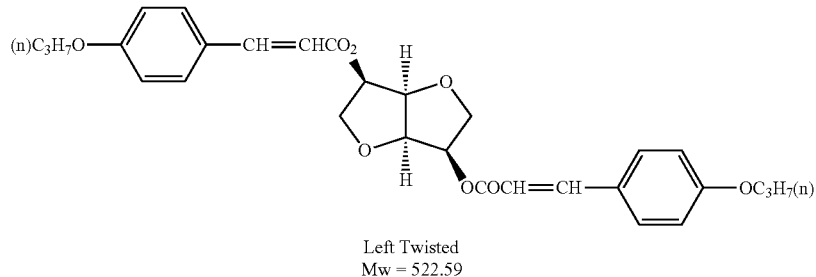
Left Twisted
Mw = 522.59
(25)
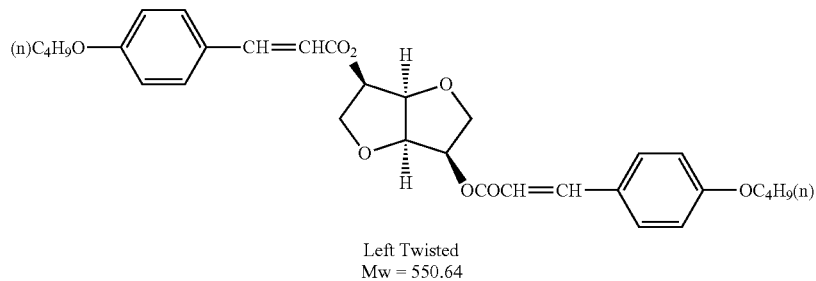
Left Twisted
Mw = 550.64
(26)
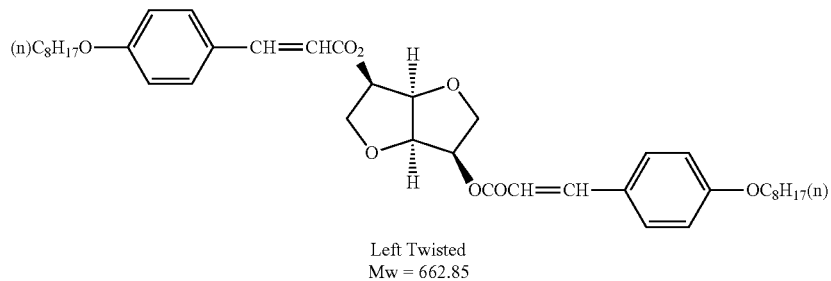
Left Twisted
Mw = 662.85
(27)
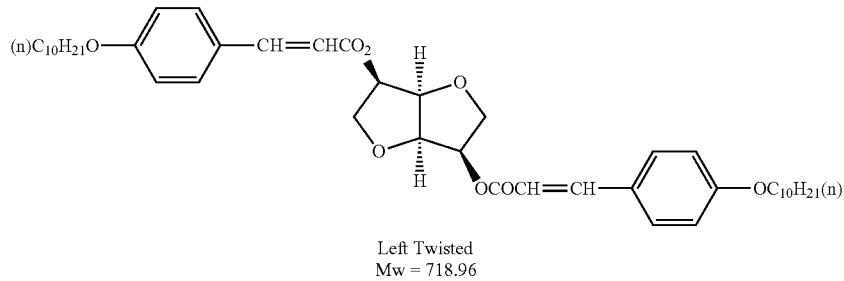
Left Twisted
Mw = 718.96

-continued (28)

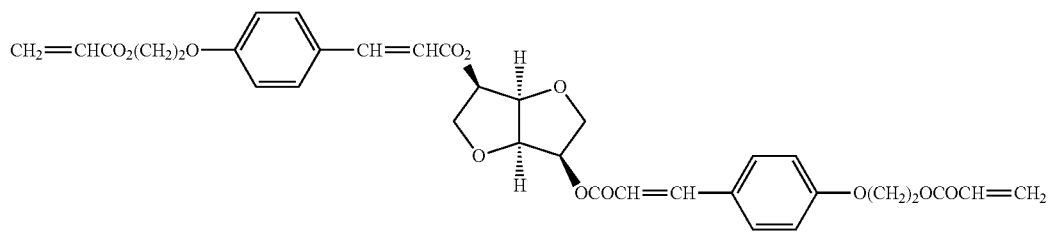

(29)

(30)

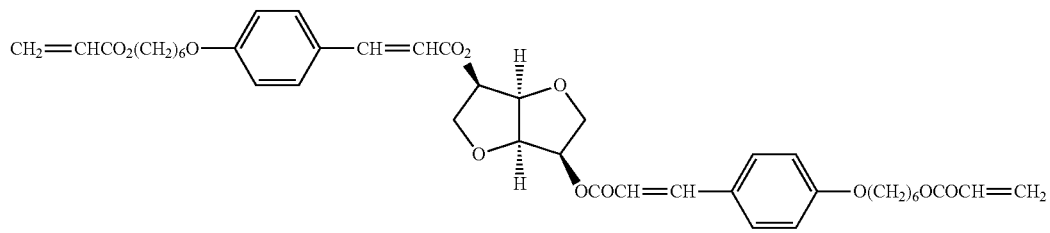

(31)

(32)

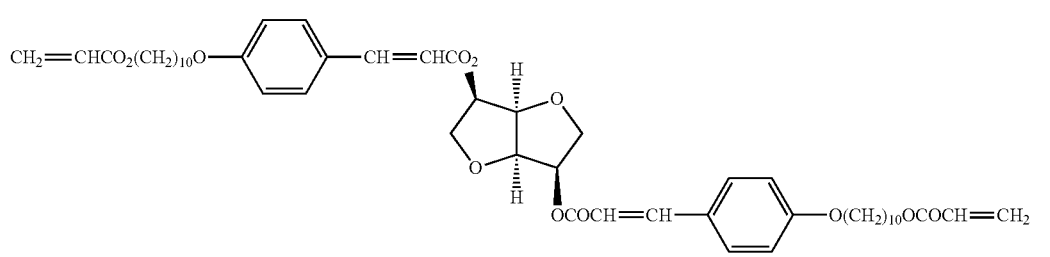

In addition, the photoreactive chiral agent can also be used in combination with a chiral agent having no photoreactivity such as a chiral compound having a large temperature dependence of the helical twisting power. Examples of the well-known chiral agent having no photoreactivity include chiral agents described in JP2000-044451A, JP1998-509726A (JP-H10-509726A), WO1998/000428A, JP2000-506873A, JP1997-506088A (JP-H09-506088A), Liquid Crystals (1996, 21, 327), and Liquid Crystals (1998, 24, 219).

<Action of Optical Element>

As described above, the optically-anisotropic layer that is formed using the composition including the liquid crystal compound and has the liquid crystal alignment pattern in which the direction of the optical axis 30A rotates in the arrow X direction refracts circularly polarized light, in which as the single periods Λ of the liquid crystal alignment pattern decreases, the refraction angle is large.

Therefore, for example, in a case where a pattern is formed such that the single periods Λ of the liquid crystal alignment patterns are different from each other in different in-plane regions, light that is incident into the different in-plane regions and refracted at different angles such that the brightness of the transmitted light varies depending on the refraction angles. In particular, in a case where the refraction angle is large, the brightness of the transmitted light is low.

On the other hand, in the optical element according to the embodiment of the present invention, the optically-anisotropic layer has a liquid crystal alignment pattern in which a direction of an optical axis derived from a liquid crystal compound rotates in one in-plane direction, and the optically-anisotropic layer has regions in which the optical axis is twisted in a thickness direction of the optically-anisotropic layer and rotates, the regions having different magnitudes of twist angles of the rotation in a plane. The structure where the optical axis of the liquid crystal compound is twisted in the thickness direction of the optically-anisotropic layer and rotates can be formed by adding the above-described chiral agent to the liquid crystal composition. In addition, the configuration in which the in-plane regions have different twist angles in the thickness direction can be formed by adding the above-described photoreactive chiral agent to the liquid crystal composition and irradiating the in-plane regions with light at different irradiation doses.

In the optical element according to the embodiment of the present invention, the refraction angle dependence of the amount of transmitted light in a plane is small, and, for example, in a case where light incident into different in-plane regions is refracted at different angles, the brightness of the transmitted light can be increased.

Hereinafter, the action of the optical element 10 will be described in detail with reference to the conceptual diagrams of FIG. 6.

In the optical element according to the embodiment of the present invention, basically, only the optically-anisotropic layer exhibits an optical action. Therefore, in order to simplify the drawing and to clarify the configuration and the action, FIG. 6 shows only the first optically-anisotropic layer 26A in the first optically-anisotropic member 12.

As described above, in the optical element 10, the first optically-anisotropic member 12 including the first optically-anisotropic layer 26A is provided.

For example, the optical element 10 refracts circularly polarized light as incidence light to be transmitted in a predetermined direction. In FIG. 6, the incidence light is left circularly polarized light.

Figure 6:
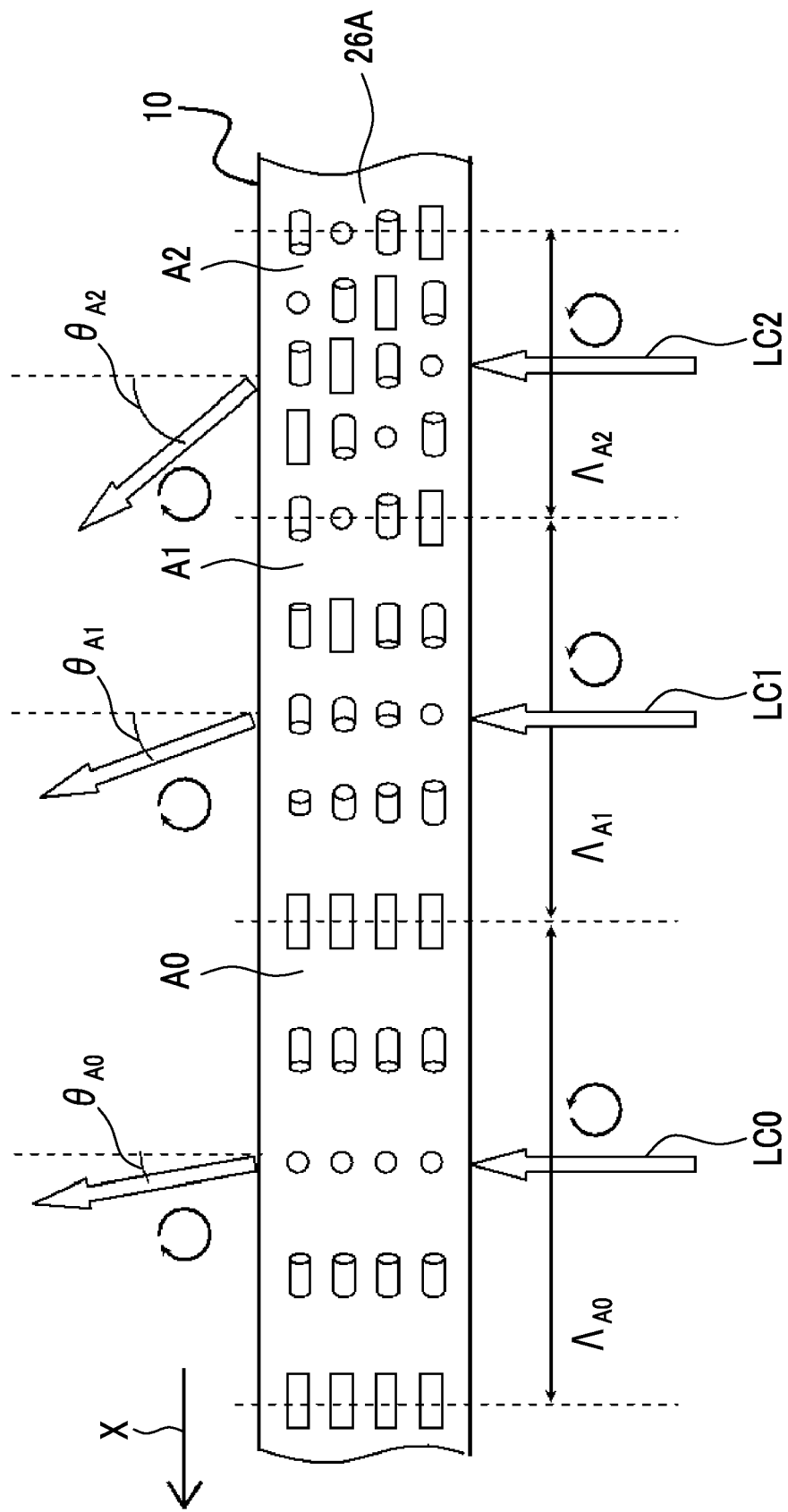
FIG. 6 is a conceptual diagram showing the action of the optical element shown in FIG. 1.

In the portion shown in FIG. 6, the optically-anisotropic layer 26A includes three regions A0, A1, and A2 in order from the left side in FIG. 6, and the respective regions have different lengths Λ of single periods. Specifically, the length Λ of the single period decreases in order from the regions A0, A1, and A2. In addition, the regions A1 and A2 have a structure (hereinafter, also referred to as "twisted structure") in which the optical axis is twisted in the thickness direction of the optically-anisotropic layer and rotates. The twist angle of the region A1 in the thickness direction is less than the twist angle of the region A2 in the thickness direction. The region A0 is a region not having the twisted structure (that is, the twist angle is 0°). In this regard, as shown in FIG. 1, one distance is $L_1$ in the region $A_1$ in which a single period in the liquid crystal alignment pattern is $\Lambda_{A1}$, and the other distance is $L_2$ in the region $A_2$ in which a single period in the liquid crystal alignment pattern is $\Lambda_{A2}$ (i.e., the distances are different from each other).

The twist angle is a twist angle in the entire thickness direction.

In the optical element 10, in a case where left circularly polarized light LC1 incident into the in-plane region A1 of the first optically-anisotropic layer 26A, as described above, the left circularly polarized light LC1 is refracted and transmitted at a predetermined angle in the arrow X direction with respect to the incidence direction, that is, in the in-plane direction in which the direction of the optical axis of the liquid crystal compound changes while continuously rotating. Likewise, in a case where left circularly polarized light LC2 is incident into the in-plane region A2 of the first optically-anisotropic layer 26A, the left circularly polarized light LC2 is refracted and transmitted at a predetermined angle in the arrow X direction with respect to the incidence direction. Likewise, in a case where left circularly polarized light LC0 is incident into the in-plane region A0 of the first optically-anisotropic layer 26A, the left circularly polarized light LC0 is refracted and transmitted at a predetermined angle in the arrow X direction with respect to the incidence direction.

Regarding the refraction angles from the first optically-anisotropic layer 26A, since a single period $\Lambda_{A2}$ of the liquid crystal alignment pattern of the region A2 is shorter than a single period $\Lambda_{A1}$ of the liquid crystal alignment pattern of the region A1, as shown in FIG. 6, a refraction angle $\theta_{A2}$ of transmitted light of the region A2 is more than a refraction angle $\theta_{A1}$ of transmitted light of the region A1 with respect to the incidence light. In addition, since a single period $\Lambda_{A0}$ of the liquid crystal alignment pattern of the region A0 is longer than the single period $\Lambda_{A1}$ of the liquid crystal alignment pattern of the region A1, as shown in FIG. 6, a refraction angle $\theta_{A0}$ of transmitted light of the region A0 is less than the refraction angle $\theta_{A1}$ of transmitted light of the region A1 with respect to the incidence light.

Here, in the diffraction of light by the optically-anisotropic layer having the liquid crystal alignment pattern in which the direction of the optical axis of the liquid crystal compound changes while continuously rotating in a plane, there is a problem in that, in a case where the diffraction angle increases, the diffraction efficiency decreases, that is, the intensity of diffracted light decreases.

Therefore, in a case where the optically-anisotropic layer has regions having different lengths of the single periods over which the direction of the optical axis of the liquid crystal compound rotates by 180° in a plane, the diffraction angle varies depending on light incidence positions. Therefore, there is a difference in the amount of diffracted light depending on in-plane incidence positions. That is, it was found that there is a problem in that a region where the brightness of light transmitted and diffracted is low depending on in-plane incidence positions is present.

On the other hand, in the optical element according to the embodiment of the present invention, the optically-anisotropic layer has regions in which the optical axis is twisted in a thickness direction of the optically-anisotropic layer and rotates, the regions having different magnitudes of twist angles in the thickness direction.

In the example shown in FIG. 6, in the first optically-anisotropic layer 26A, a twist angle $\phi_{A2}$ of the region A2 in the thickness direction is more than a twist angle $\phi_{A1}$ of the region A1 in the thickness direction. In addition, the region A0 does not have the twisted structure in the thickness direction.

As a result, a decrease in the diffraction efficiency of refracted light can be suppressed.

In the example shown in FIG. 6, by imparting the twisted structure to the regions A1 and A2 in which the diffraction angle is more than that of the region A0, a decrease in the amount of light refracted from the regions A1 and A2 can be suppressed. In addition, the twist angle of the twisted structure of the region A2 in which the diffraction angle is more than that of the region A1 is adjusted to be more than that of the region A1 such that a decrease in the amount of light refracted from the region A2 can be suppressed. As a result, the amounts of light transmitted through in-plane incidence positions can be made to be uniform.

This way, in the optical element 10 according to the embodiment of the present invention, in an in-plane region where refraction from the optically-anisotropic layer is large, incidence light is transmitted and refracted in a layer where the twist angle in the thickness direction is large. On the other hand, in an in-plane region where refraction from the optically-anisotropic layer is small, incidence light is transmitted and refracted in a layer where the twist angle in the thickness direction is small.

That is, in the optical element 10, by setting the twist angle in the thickness direction in a plane according to the magnitude of refraction from the optically-anisotropic layer, the brightness of transmitted light with respect to incidence light can be increased.

Therefore, in the optical element 10 according to the embodiment of the present invention, the refraction angle dependence of the amount of transmitted light in a plane can be reduced.

As described above, the angle of refracted light in a plane of the first optically-anisotropic layer 26A increases as the single period Λ of the liquid crystal alignment pattern decreases.

In addition, the twist angle in the thickness direction in a plane of the first optically-anisotropic layer 26A in the region where the length of the single period Λ over which the direction of the optical axis 30A rotates by 180° in the arrow X direction in the liquid crystal alignment pattern is short is longer than that in the region where the single period Λ is long. In the optical element 10, for example, as shown in FIG. 6, the single period $\Lambda_{A2}$ of the liquid crystal alignment pattern in the region A2 of the first optically-anisotropic layer 26A is shorter than the single period $\Lambda_{A1}$ of the liquid crystal alignment pattern in the region A1, and the twist angle $\phi_{A2}$ in the thickness direction is large. That is, in the region A2 of the first optically-anisotropic layer 26A on the light incidence side, light is largely refracted.

Accordingly, by setting the twist angle φ in the thickness direction in a plane with respect to the single period Λ of the liquid crystal alignment pattern as a target, the brightness of transmitted light refracted from different in-plane regions at different angles can be suitably increased.

In the optical element according to the embodiment of the present invention, as described above, the length of the single period Λ of the liquid crystal alignment pattern decreases, the refraction angle increases. Therefore, by setting the twist angle in the thickness direction to be long in the region where the length of the single period Λ of the liquid crystal alignment pattern is short, the brightness of transmitted light can be increased.

Therefore, in the optical element according to the embodiment of the present invention, in regions having different lengths of single periods of liquid crystal alignment patterns, it is preferable that a permutation of the lengths of the single periods and a permutation of the magnitudes of the twist angles in the thickness direction are different from each other.

However, the present invention is not limited to this configuration. In the optical element according to the embodiment of the present invention, in regions having different lengths of single periods of liquid crystal alignment patterns, a permutation of the lengths of the single periods and a permutation of the magnitudes of the twist angles in the thickness direction may be the same as each other. In the optical element according to the embodiment of the present invention, the twist angle in the thickness direction has a preferable range and may be appropriately set according to the single period Λ of the liquid crystal alignment pattern in a plane.

In addition, in the optical element according to the embodiment of the present invention, it is preferable that the optically-anisotropic layer has a region in which the magnitudes of the twist angles in the thickness direction are 10° to 360°.

In the optical element according to the embodiment of the present invention, the twist angle in the thickness direction may be appropriately set according to the single period Λ of the liquid crystal alignment pattern in a plane.

Here, in the example shown in FIG. 1, the optical element 10 includes one optically-anisotropic layer, but the present invention is not limited thereto. The optical element may include two or more optically-anisotropic layers.

In addition, in a case where the optical element according to the embodiment of the present invention includes two or more optically-anisotropic layers, the optical element may further include optically-anisotropic layers having different directions (directions of the twist angle) in which the optical axis is twisted in the thickness direction and rotates.

For example, optically-anisotropic layers may be laminated to be used, in which each of the optically-anisotropic layers has a liquid crystal alignment pattern in which a direction of an optical axis derived from a liquid crystal compound rotates in one in-plane direction, each of the optically-anisotropic layers has regions in which the optical axis is twisted in a thickness direction of the optically-anisotropic layer and rotates, the regions having different magnitudes of twist angles of the rotation in a plane, and the optically-anisotropic layers have different directions in which the optical axis is twisted in the thickness direction and rotates.

This way, in a case where the optical element further includes optically-anisotropic layers having different directions in which the optical axis is twisted in the thickness direction and rotates, transmitted light of incidence light having various polarization states can be efficiently refracted in a region having a twist angle in the thickness direction.

Here, in a case where the optical element includes optically-anisotropic layers having different directions in which the optical axis is twisted in the thickness direction and rotates, it is preferable that in-plane regions have the same twist angle in the thickness direction.

However, the present invention is not limited to this configuration. In the optical element according to the embodiment of the present invention, the twist angle in the thickness direction is not particularly limited and may be appropriately set according to the use of the optical element or the like.

In addition, in the optically-anisotropic layers having different directions in which the optical axis is twisted in the thickness direction and rotates, it is preferable that in-plane retardations $Re(\lambda)=\Delta n_\lambda \times d$ of the plurality of regions R of the optically-anisotropic layer with respect to incidence light having a wavelength of λ nm are the same.

However, the present invention is not limited to this configuration, and in the optical element according to the embodiment of the present invention, the in-plane retardation $Re(\lambda)=\Delta n_\lambda \times d$ of the plurality of regions R of the optically-anisotropic layer with respect to incidence light having a wavelength of λ nm is not particularly limited and may be appropriately set depending on the use of the optical element and the like.

In the optical element according to the embodiment of the present invention, the single period Λ in the alignment pattern of the optically-anisotropic layer is not particularly limited and may be appropriately set depending on the use of the optical element and the like.

Here, as described below, the optical element according to the embodiment of the present invention can be suitably used as, for example, a diffraction element that refracts light displayed by a display to be introduced into a light guide plate in AR glasses or a diffraction element that refracts light propagated in a light guide plate to be emitted to an observation position by a user from the light guide plate. In particular, the optical element that can deal with a full color image can be suitably used as a diffraction element in AR glasses.

At this time, in order to totally reflect light from the light guide plate, it is necessary to refract light to be introduced into the light guide plate at a large angle to some degree with respect to incidence light. In addition, in order to reliably emit light propagated in the light guide plate, it is necessary to refract light at a large angle to some degree with respect to incidence light.

In addition, as described above, regarding the transmission angle of light through the optically-anisotropic layer, the angle of transmitted light with respect to incidence light can be increased by reducing the single period Λ in the liquid crystal alignment pattern.

In consideration of this point, the single period Λ in the liquid crystal alignment pattern of the optically-anisotropic layer is preferably 50 μm or less, more preferably 10 μm or less, and still more preferably 3 μm or less.

In consideration of the accuracy of the liquid crystal alignment pattern and the like, the single period Λ in the liquid crystal alignment pattern of the optically-anisotropic layer is preferably 0.1 μm or more.

In addition, in a case where the optical element according to the embodiment of the present invention includes two or more optically-anisotropic layers, the optical element may further include optically-anisotropic layers having the same direction in which the optical axis is twisted in the thickness direction and rotates.

For example, optically-anisotropic layers may be laminated to be used, in which each of the optically-anisotropic layers has a liquid crystal alignment pattern in which a direction of an optical axis derived from a liquid crystal compound rotates in one in-plane direction, each of the optically-anisotropic layers has regions in which the optical axis is twisted in a thickness direction of the optically-anisotropic layer and rotates, and the optically-anisotropic layers have the same direction in which the optical axis is twisted in the thickness direction and rotates.

Here, in a case where the optically-anisotropic layers having the same direction in which the optical axis is twisted in the thickness direction and rotates are laminated to be used, it is preferable that twist angles at which the optical axis is twisted in the thickness direction of the optically-anisotropic layers and rotates are different from each other.

This way, in a case where the optical element further includes optically-anisotropic layers having the same direction in which the optical axis is twisted in the thickness direction and rotates and having different twist angles, transmitted light of light incident at various angles can be efficiently refracted (diffracted) in a region having a twist angle in the thickness direction. Accordingly, in a case where the optical element is used as a diffraction element of a light guide element used in an AR display device such as AR glasses, transmitted light can be efficiently refracted (diffracted) in a wide viewing angle range.

In addition, in a case where the optical element according to the embodiment of the present invention includes two or more optically-anisotropic layers, the optically-anisotropic layers may have liquid crystal alignment patterns having the same direction in which a direction of an optical axis derived from the liquid crystal compound continuously rotates in at least one in-plane direction.

(Method of Forming Regions Having Different Twist Angles of Twisted Structure)

In the configuration in which the optically-anisotropic layer has regions having different twist angles of the twisted structure, the chiral agent in which back isomerization, dimerization, isomerization, dimerization or the like occurs during light irradiation such that the helical twisting power (HTP) changes is used. By irradiating the liquid crystal composition with light having a wavelength at which the HTP of the chiral agent changes before or during the curing of the liquid crystal composition for forming the optically-anisotropic layer while changing the irradiation dose for each of the regions, the regions having different helical pitches can be formed.

For example, by using a chiral agent in which the HTP decreases during light irradiation, the HTP of the chiral agent decreases during light irradiation. Here, by changing the irradiation dose of light for each of the regions, for example, in a region that is irradiated with the light at a high irradiation dose, the decrease in HTP is large, the induction of helix is small, and thus the twist angle of the twisted structure decreases. On the other hand, in a region that is irradiated with the light at a low irradiation dose, a decrease in HTP is small, and thus the twist angle of the twisted structure is large.

The method of changing the irradiation dose of light for each of the regions is not particularly limited, and a method of irradiating light through a gradation mask, a method of changing the irradiation time for each of the regions, or a method of changing the irradiation intensity for each of the regions can be used.

The gradation mask refers to a mask in which a transmittance with respect to light for irradiation changes in a plane.

In the optical elements shown in FIGS. 1 to 6, the optical axis 30A of the liquid crystal compound 30 in the liquid crystal alignment pattern of the optically-anisotropic layer continuously rotates only in the arrow X direction.

However, the present invention is not limited thereto, and various configurations can be used as long as the optical axis 30A of the liquid crystal compound 30 in the optically-anisotropic layer continuously rotates in the in-plane direction.

Figure 8:
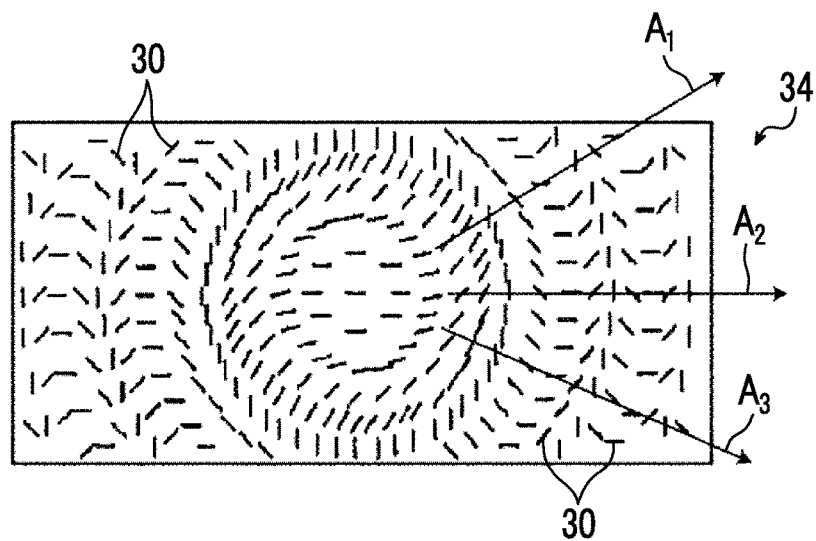
FIG. 8 is a plan view showing another example of the optically-anisotropic layer of the optical element according to the present invention.

For example, an optically-anisotropic layer 34 conceptually shown in a plan view of FIG. 8 can be used, in which a liquid crystal alignment pattern is a concentric circular pattern having a concentric circular shape where the in-plane direction in which the direction of the optical axis of the liquid crystal compound 30 changes while continuously rotating moves from an inside toward an outside. In other words, the liquid crystal alignment pattern of the optically-anisotropic layer 34 shown in FIG. 8 is a liquid crystal alignment pattern where the in-plane direction in which the direction of the optical axis of the liquid crystal compound 30 changes while continuously rotating is provided in a radial shape from the center of the optically-anisotropic layer 34.

FIG. 8 shows only the liquid crystal compound 30 of the surface of the alignment film as in FIG. 4. However, as in the example shown in FIG. 2, the optically-anisotropic layer 34 has the structure in which the liquid crystal compound 30 on the surface of the alignment film is laminated as described above.

In the optically-anisotropic layer 34 shown in FIG. 8, the optical axis (not shown) of the liquid crystal compound 30 is a longitudinal direction of the liquid crystal compound 30.

In the optically-anisotropic layer 34, the direction of the optical axis of the liquid crystal compound 30 changes while continuously rotating in a direction in which a large number of optical axes move to the outside from the center of the optically-anisotropic layer 34, for example, a direction indicated by an arrow A1, a direction indicated by an arrow A2, a direction indicated by an arrow A3, or . . . .

In circularly polarized light incident into the optically-anisotropic layer 34 having the above-described liquid crystal alignment pattern, the absolute phase changes depending on individual local regions having different directions of optical axes of the liquid crystal compound 30. At this time, the amount of change in absolute phase varies depending on the directions of the optical axes of the liquid crystal compound 30 into which circularly polarized light is incident.

This way, in the optically-anisotropic layer 34 having the concentric circular liquid crystal alignment pattern, that is, the liquid crystal alignment pattern in which the optical axis changes while continuously rotating in a radial shape, transmission of incidence light can be allowed as diverging light or converging light depending on the rotation direction of the optical axis of the liquid crystal compound 30 and the direction of circularly polarized light to be incident.

That is, by setting the liquid crystal alignment pattern of the optically-anisotropic layer in a concentric circular shape, the optical element according to the embodiment of the present invention exhibits, for example, a function as a convex lens or a concave lens.

Here, in a case where the liquid crystal alignment pattern of the optically-anisotropic layer is concentric circular such that the optical element functions as a convex lens, it is preferable that the length of the single period Λ over which the optical axis rotates by 180° in the liquid crystal alignment pattern gradually decreases from the center of the optically-anisotropic layer 34 toward the outer direction in the in-plane direction in which the optical axis continuously rotates.

As described above, the refraction angle of light with respect to an incidence direction increases as the length of the single period Λ in the liquid crystal alignment pattern decreases. Accordingly, the length of the single period Λ in the liquid crystal alignment pattern gradually decreases from the center of the optically-anisotropic layer 34 toward the outer direction in the in-plane direction in which the optical axis continuously rotates. As a result, the light gathering power of the optically-anisotropic layer 34 can be improved, and the performance as a convex lens can be improved.

In the present invention, depending on the uses of the optical element such as a concave lens, it is preferable that the length of the single period Λ over which the optical axis rotates by 180° in the liquid crystal alignment pattern gradually decreases from the center of the optically-anisotropic layer 34 toward the outer direction in the in-plane direction by reversing the direction in which the optical axis continuously rotates.

As described above, the refraction angle of light with respect to an incidence direction increases as the length of the single period Λ in the liquid crystal alignment pattern decreases. Accordingly, the length of the single period Λ in the liquid crystal alignment pattern gradually decreases from the center of the optically-anisotropic layer 34 toward the outer direction in the in-plane direction in which the optical axis continuously rotates. As a result, the light diverging power of the optically-anisotropic layer 34 can be improved, and the performance as a concave lens can be improved.

In the present invention, for example, in a case where the optical element is used as a concave lens, it is preferable that the turning direction of incident circularly polarized light is reversed.

In the present invention, in a case where the optical element is made to function as a convex lens or a concave lens, it is preferable that the optical element satisfies the following expression.

$$\Phi(r)=(\pi/\lambda)[(r^2+f^2)^{1/2}-f]$$

Here, r represents a distance from the center of a concentric circle and is represented by the following expression "$r=(x^2+y^2)^{1/2}$". x and y represent in-plane positions, and $(x,y)=(0,0)$ represents the center of the concentric circle. $\Phi(r)$ represents an angle of the optical axis at the distance r from the center, λ represents a wavelength, and f represents a desired focal length.

In the present invention, conversely, the length of the single period Λ in the concentric circular liquid crystal alignment pattern may gradually increase from the center of the optically-anisotropic layer 34 toward the outer direction in the in-plane direction in which the optical axis continuously rotates.

Further, depending on the uses of the optical element such as a case where it is desired to provide a light amount distribution in transmitted light, a configuration in which regions having partially different lengths of the single periods Λ in the in-plane direction in which the optical axis continuously rotates are provided can also be used instead of the configuration in which the length of the single period Λ gradually changes in the in-plane direction in which the optical axis continuously rotates.

Further, the optical element according to the embodiment of the present invention may include: an optically-anisotropic layer in which the single period Λ is uniform over the entire surface; and an optically-anisotropic layer in which regions having different lengths of the single periods Λ are provided. This point is also applicable to a configuration in which the optical axis continuously rotates only in the in-plane direction as shown in FIG. 1.

Figure 9:
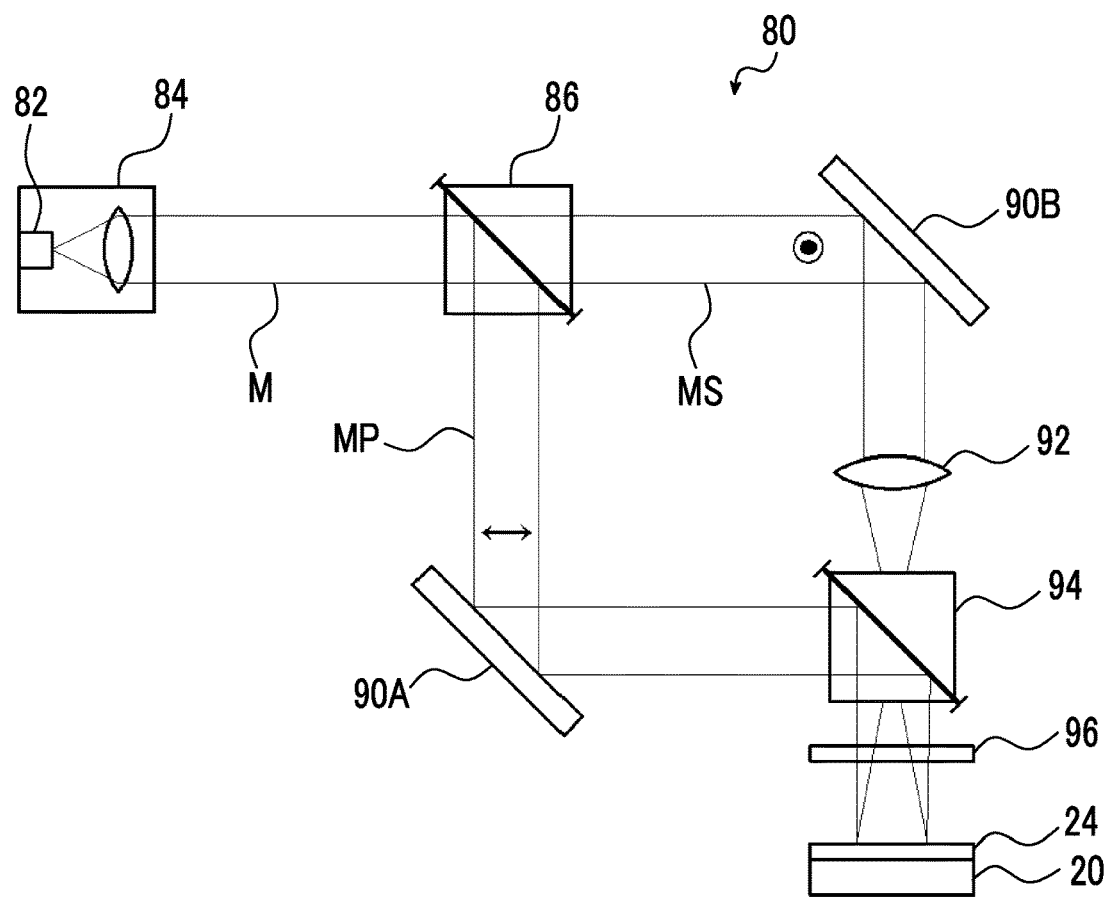
FIG. 9 is a diagram conceptually showing one example of an exposure device that exposes an alignment film forming the optically-anisotropic layer shown in FIG. 8.

FIG. 9 conceptually shows an example of an exposure device that forms the concentric circular alignment pattern in the alignment film (for example, the alignment film 24A, the alignment film 24B, and the alignment film 24C).

An exposure device 80 includes: a light source 84 that includes a laser 82; a polarization beam splitter 86 that divides the laser light M emitted from the laser 82 into S polarized light MS and P polarized light MP; a mirror 90A that is disposed on an optical path of the P polarized light MP; a mirror 90B that is disposed on an optical path of the S polarized light MS; a lens 92 that is disposed on the optical path of the S polarized light MS; a polarization beam splitter 94; and a λ/4 plate 96.

The P polarized light MP that is split by the polarization beam splitter 86 is reflected from the mirror 90A to be incident into the polarization beam splitter 94. On the other hand, the S polarized light MS that is split by the polarization beam splitter 86 is reflected from the mirror 90B and is gathered by the lens 92 to be incident into the polarization beam splitter 94.

The P polarized light MP and the S polarized light MS are multiplexed by the polarization beam splitter 94, are converted into right circularly polarized light and left circularly polarized light by the λ/4 plate 96 depending on the polarization direction, and are incident into the alignment film 24 on the support 20.

Due to interference between the right circularly polarized light and the left circularly polarized light, the polarization state of light with which the alignment film 24 is irradiated periodically changes according to interference fringes. The intersection angle between the right circularly polarized light and the left circularly polarized light changes from the inside to the outside of the concentric circle. Therefore, an exposure pattern in which the pitch changes from the inside to the outside can be obtained. As a result, in the alignment film 24, a concentric circular alignment pattern in which the alignment state periodically changes can be obtained.

In the exposure device 80, the single period Λ in the liquid crystal alignment pattern in which the optical axis of the liquid crystal compound 30 continuously rotates by 180° in the in-plane direction can be controlled by changing the refractive power of the lens 92 (the F number of the lens 92), the focal length of the lens 92, the distance between the lens 92 and the alignment film 24, and the like.

In addition, by adjusting the refractive power of the lens 92 (the F number of the lens 92), the length Λ of the single period in the liquid crystal alignment pattern in the in-plane direction in which the optical axis continuously rotates can be changed.

Specifically, In addition, the length Λ of the single period in the liquid crystal alignment pattern in the in-plane direction in which the optical axis continuously rotates can be changed depending on a light spread angle at which light is spread by the lens 92 due to interference with parallel light. More specifically, in a case where the refractive power of the lens 92 is weak, light is approximated to parallel light. Therefore, the length Λ of the single period in the liquid crystal alignment pattern gradually decreases from the inside toward the outside, and the F number increases. Conversely, in a case where the refractive power of the lens 92 becomes stronger, the length Λ of the single period in the liquid crystal alignment pattern rapidly decreases from the inside toward the outside, and the F number decreases.

This way, the configuration of changing the length of the single period Λ over which the optical axis rotates by 180° in the in-plane direction in which the optical axis continuously rotates can also be used in the configuration shown in FIGS. 1 to 6 in which the optical axis 30A of the liquid crystal compound 30 continuously rotates only in the in-plane direction as the arrow X direction.

For example, by gradually decreasing the single period Λ of the liquid crystal alignment pattern in the arrow X direction, an optical element that allows transmission of light to be gathered can be obtained. In addition, by reversing the direction in which the optical axis in the liquid crystal alignment pattern rotates by 180°, an optical element that allows transmission of light to be diffused only in the arrow X direction can be obtained. By reversing the turning direction of incident circularly polarized light, an optical element that allows transmission of light to be diffused only in the arrow X direction can be obtained.

Further, depending on the uses of the optical element such as a case where it is desired to provide a light amount distribution in transmitted light, a configuration in which regions having partially different lengths of the single periods Λ in the arrow X direction are provided can also be used instead of the configuration in which the length of the single period Λ gradually changes in the arrow X direction. For example, as a method of partially changing the single period Λ, for example, a method of scanning and exposing the photo-alignment film to be patterned while freely changing a polarization direction of laser light to be gathered can be used.

[Light Guide Element and Image Display Device]

The optical element according to the embodiment of the present invention is used as a diffraction element of a light guide element used in AR glasses or the like.

Figure 12:
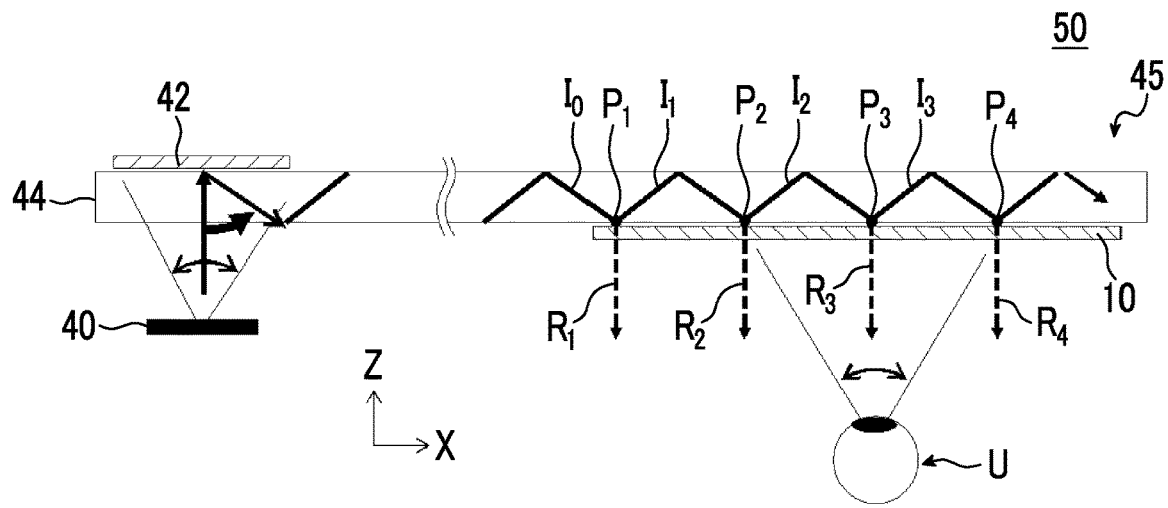
FIG. 12 is a diagram schematically showing an example of an image display device including the optical element according to the present invention.

FIG. 12 conceptually shows an example of a light guide element and an image display device (AR display device) including the optical element according to the embodiment of the present invention.

An AR display device 50 shown in FIG. 12 includes a display (display element) 40 and a light guide element 45.

The light guide element 45 includes the optical element 10 according to the embodiment of the present invention, a light guide plate 44, and a diffraction element 42.

The light guide plate 44 guides light in a rectangular shape that is elongated in one direction.

As shown in FIG. 12, the diffraction element 42 is disposed on a surface (main surface) of the light guide plate 44 on one end portion side in a longitudinal direction. In addition, the optical element 10 is disposed on a surface (main surface) of the light guide plate 44 on another end portion side. The disposition position of the diffraction element 42 corresponds to a light incidence position of the light guide plate 44, and the disposition position of the optical element 10 corresponds to a light emission position of the light guide plate 44. In addition, the diffraction element 42 and the optical element 10 are disposed on different surfaces of the light guide plate 44.

The light guide plate 44 is not particularly limited, and a well-known light guide plate of the related art that is used in an image display device or the like can be used.

The diffraction element 42 diffracts light emitted from the display 40 and incident into the light guide plate 44 such that the light is totally reflected in the light guide plate 44.

The diffraction element 42 is not particularly limited, and various diffraction elements used in an AR display device, for example, a relief type diffraction element, a diffraction element using liquid crystal, or a volume hologram element can be used.

In addition, the diffraction element 42 is not limited to a reflection type diffraction element and may be a transmission type diffraction element. In a case where the diffraction element 42 is a transmission type diffraction element, the diffraction element 42 is disposed on a surface of the light guide plate 44 facing the display 40.

As shown in FIG. 12, the display 40 is disposed on a surface of one end portion of the light guide plate 44 opposite to the surface where the diffraction element 42 is disposed. In addition, a surface of the one end portion of the light guide plate 44 on the side where the optical element 10 is disposed is an observation position of a user U.

In the following description, the longitudinal direction of the light guide plate 44 will be referred to as "X direction", and a direction that is perpendicular to the X direction and perpendicular to the surface of the optical element 10 will be referred to as "Z direction". The Z direction may be a laminating direction of the respective layers of the optical element 10.

The display 40 is not particularly limited. For example, various well-known displays used in an Ar display device such as AR glasses can be used.

Examples of the display 40 include devices employing a liquid crystal display (LCOS including Liquid Crystal On Silicon), an organic electroluminescence display, digital light processing (DLP), or Micro Electro Mechanical Systems (MEMS).

The display 40 may display a monochrome image, a two-color image, or a color image.

In addition, light emitted from the display 40 may be unpolarized light or polarized light and is preferably circularly polarized light. In a case where the display 40 emits circularly polarized light, the light guide element 45 can efficiently guide the light emitted from the display 40.

In the AR display device 50 having the above-described configuration, as indicated by arrows, light displayed by the display 40 is incident into the light guide plate 44 from the surface of the one end portion of the light guide plate 44 opposite to the surface where the diffraction element 42 is disposed. The light incident into the light guide plate 44 is reflected from an interface between the light guide plate 44 and the diffraction element 42. At this time, the light is reflected in a direction having an angle different from that of a specular reflection direction due to the diffraction effect of the diffraction element 42 without being specularly reflected (regularly reflected). In the example shown in FIG. 12, light is incident from a direction (Z direction) substantially perpendicular to the diffraction element 42, and is reflected in a direction that is tilted with a large angle from the perpendicular direction toward the longitudinal direction (X direction) of the light guide plate 44.

Since the light reflected from the diffraction element 42 is reflected with a large angle with respect to the angle of the incidence light, an angle of a light traveling direction with respect to the surface of the light guide plate 44 is small. Therefore, the light is totally reflected from the both surfaces (interface) of the light guide plate 44 and is guided in the longitudinal direction (X direction) in the light guide plate 44.

The light guided in the light guide plate 44 is incident into and transmitted through the optical element 10 in another end portion of the light guide plate 44 in the longitudinal direction. At this time, the light is transmitted in a direction having an angle different from that of the incidence direction due to the diffraction effect of the optical element 10. In the example shown in FIG. 12, the light is incident from an oblique direction with respect to the optical element 10 and is transmitted in a direction perpendicular to the surface of the optical element 10.

The light transmitted through the optical element 10 is emitted to the outside of the light guide plate 44. That is, the light is emitted to the observation position of the user U.

This way, in an AR display device 50, an image displayed by the display 40 is incident into one end of the light guide plate 44, propagates in the light guide plate 44, and is emitted from another end of the light guide plate 44 such that the virtual image is displayed to be superimposed on a scene that is actually being seen by the user U.

Here, in the light guide element 45, the diffraction efficiency of the optically-anisotropic layer of the optical element 10 is adjusted, and in a case where the light propagated in the light guide plate 44 is diffracted by the optical element 10, a part of the light is diffracted at a plurality of positions to be emitted to the outside of the light guide plate 44. As a result, the viewing zone can be expanded (exit pupil expansion).

Specifically, in FIG. 12, light $I_0$ propagated in the light guide plate 44 reaches the position of the optical element 10 while being repeatedly reflected from both surfaces (interface) of the light guide plate 44. A part of the light $I_0$ at the position of the optical element 10 is diffracted in a region (position) $P_1$ close to the incidence side to be emitted from the light guide plate 44 (emitted light $R_1$). In addition, light $I_1$ that is not diffracted further propagates in the light guide plate 44, and partial light $R_2$ is diffracted at a position $P_2$ of the optical element 10 to emitted from the light guide plate 44. Light $I_2$ that is not diffracted further propagates in the light guide plate 44, and partial light $R_3$ is diffracted at a position $P_3$ of the optical element 10 to emitted from the light guide plate 44. In addition, light $I_3$ that is not diffracted further propagates in the light guide plate 44, and partial light $R_4$ is diffracted at a position $P_4$ of the optical element 10 to emitted from the light guide plate 44.

This way, with the configuration where the light propagated in the light guide plate 44 is diffracted by the optical element 10 at a plurality of positions to be emitted to the outside of the light guide plate 44, the viewing zone can be expanded (exit pupil expansion).

Here, a case where the diffraction efficiency of the optical element 10 is constant in a plane is assumed. In a case where the diffraction efficiency is constant, the light intensity (light amount) of the incident light $I_0$ is high in the region (position) $P_1$ close to the incidence side. Therefore, the intensity of the emitted light $R_1$ is also high. Next, the light $I_1$ that is not diffracted propagates in the light guide plate 44 and is diffracted again at the position $P_2$ of the optical element 10 such that the partial light $R_2$ is emitted. However, the intensity of the light $I_1$ is lower than that of the light $I_0$. Therefore, even in a case where the light components are diffracted with the same diffraction efficiency, the intensity of the light $R_2$ is lower than that of the light $R_1$ reflected from the region close to the incidence side. Likewise, the light $I_2$ that is not diffracted propagates in the light guide plate 44 and is diffracted again at the position $P_3$ of the optical element 10 such that the partial light $R_3$ is emitted. However, the intensity of the light $I_2$ is lower than that of the light $I_1$. Therefore, even in a case where the light components are diffracted with the same diffraction efficiency, the intensity of the light $R_3$ is lower than that of the light $R_2$ reflected from the position $P_2$. Further, the intensity of the light $R_4$ reflected from the region $P_4$ distant from the incidence side is lower than the light $R_3$.

Figure 13:
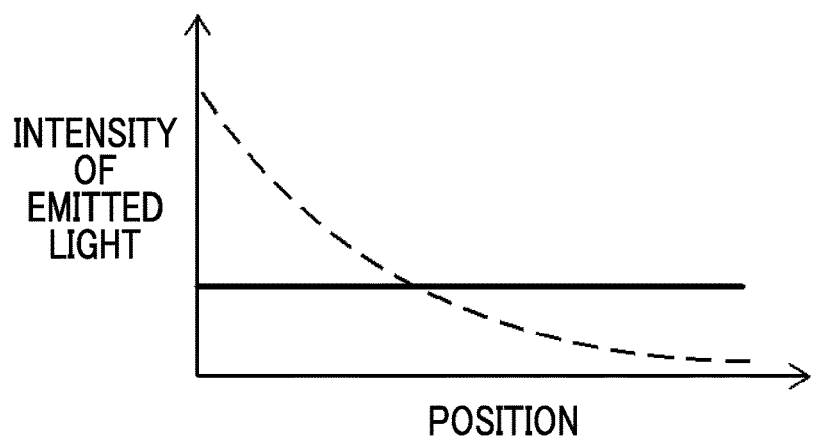
FIG. 13 is a graph schematically showing a relationship between a position and the intensity of emitted light.

This way, in a case where the diffraction efficiency of the optical element 10 is constant in a plane, light having a high light intensity is emitted from the region close to the incidence side, and light having a low light intensity is emitted from the region distant from the incidence side. Therefore, there is a problem in that, as indicated by a broken line in FIG. 13, the intensity of emitted light is not uniform depending on positions.

On the other hand, the optical element 10 according to the embodiment of the present invention has regions having different twist angles in the thickness direction in a plane of the optically-anisotropic layer, in which the twist angle in the thickness direction gradually changes from one side toward another side in the in-plane direction in which the optical axis rotates.

Figure 14:
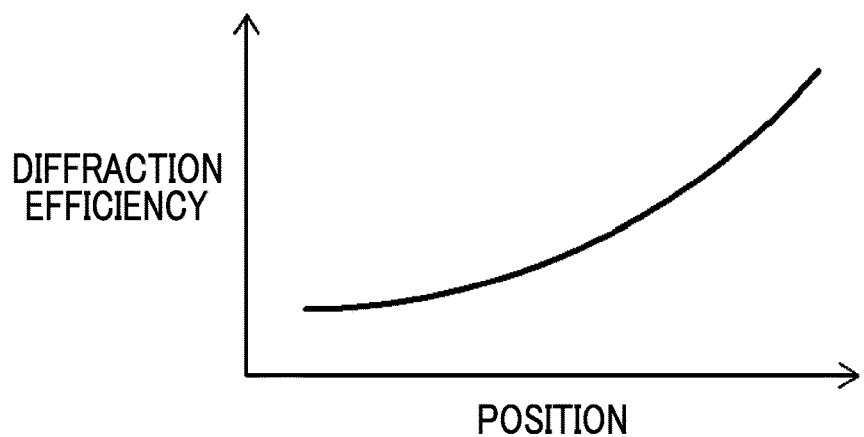
FIG. 14 is a schematic graph showing a relationship between a position and a diffraction efficiency.

As a result, the optical element 10 can be configured such that the diffraction efficiency of the optically-anisotropic layer increases from one side toward another side in the in-plane direction in which the optical axis rotates (refer to FIG. 14), and the optical element 10 can be disposed in the light guide element 45 such that the diffraction efficiency of an optically-anisotropic layer 18 increases in the light traveling direction in the light guide plate 44. That is, in the example shown in FIG. 12, the optically-anisotropic layer of the optical element 10 can be configured such that the diffraction efficiency increases from the left toward the right in FIG. 12.

In this case, at the position $P_1$ close to the incidence side, the intensity (light amount) of the incident light $I_0$ is high, but the diffraction efficiency is low. Therefore, the intensity of the emitted light $R_1$ is high to some extent. Next, the light $I_1$ that is not diffracted propagates in the light guide plate 44 and is diffracted again at the position $P_2$ of the optical element 10 such that the partial light $R_2$ is emitted. At this time, the intensity of the light $I_1$ is lower than that of the light $I_0$, but the diffraction efficiency at the position $P_2$ is higher than that at the position $P_1$. Therefore, the intensity of the light $R_2$ can be made to be the same as that of the light $R_1$ diffracted from the position $P_1$. Likewise, the light $I_2$ that is not diffracted propagates in the light guide plate 44 and is diffracted again at the position $P_3$ of the optical element 10 such that the partial light $R_3$ is emitted. At this time, the intensity of the light $I_2$ is lower than that of the light $I_1$, but the diffraction efficiency at the position $P_3$ is higher than that at the position $P_2$. Therefore, the intensity of the light $R_3$ can be made to be the same as that of the light $R_2$ diffracted from the position $P_2$. Further, the diffraction efficiency at the region $P_4$ distant from the incidence side is higher than that at the position $P_3$. Therefore, the intensity of the light $R_4$ can be made to be the same as that of the light $R_3$ reflected from the position $P_3$.

This way, the diffraction efficiency of the optical element 10 is configured to increase from one side toward another side in the in-plane direction in which the optical axis rotates. As a result, light having a constant light intensity can be emitted from any position of the optical element 10. Therefore, as indicated by a solid line in FIG. 13, the intensity of emitted light can be made uniform irrespective of positions.

In FIG. 12, light is indicated by an arrow, the light emitted from the display 40 may be a surface shape. The surface-shaped light propagates in the light guide plate 44 while maintaining a positional relationship, and is diffracted by the optical element 10.

A distribution of the diffraction efficiency of the optically-anisotropic layer may be appropriately set based on the length of the optically-anisotropic layer, the thickness of the light guide plate, the wavelength of light, and the like such that the intensity of emitted light can be made to be uniform.

In addition, the diffraction efficiency of the optically-anisotropic layer is preferably 0.5% to 20% and more preferably 1% to 10% in a region having a low diffraction efficiency, and is preferably 20% to 100% and more preferably 30% to 95% in a region having a high diffraction efficiency.

In addition, the twist angle in the thickness direction of the optically-anisotropic layer may be set according to the distribution of the diffraction efficiency.

In addition, in the description of FIG. 12, the optical element 10 includes one optically-anisotropic layer. The optical element 10 may include a plurality of optically-anisotropic layers. Alternatively, in the light guide element 45, a plurality of optical elements 10 including the single optically-anisotropic layer may be laminated.

In addition, in the example shown in FIG. 12, the light guide element 45 includes the diffraction element on each of the incidence side and the emission side. However, the present invention is not limited thereto, and an intermediate diffraction element may be provided.

Figure 15:
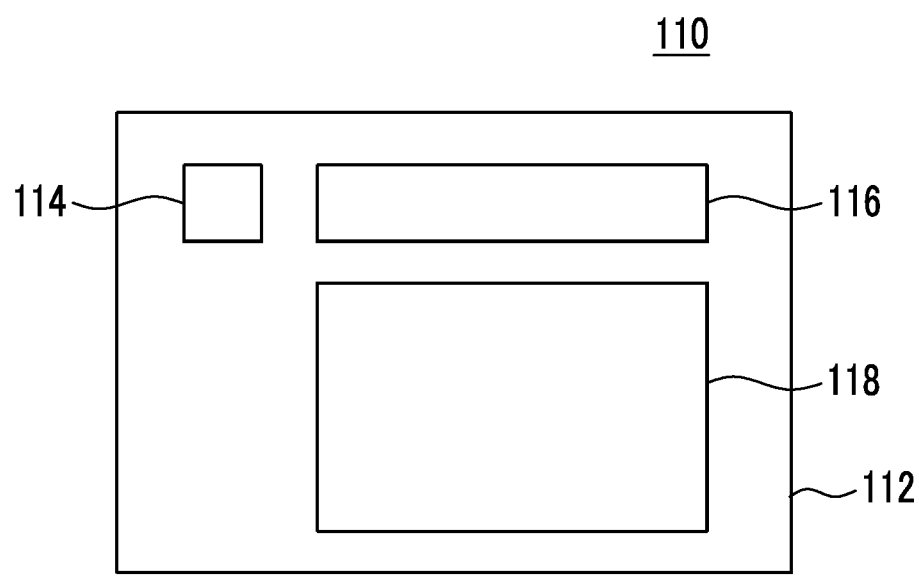
FIG. 15 is a front view schematically showing another example of a light guide element including the optical element according to the present invention.
Figure 16:
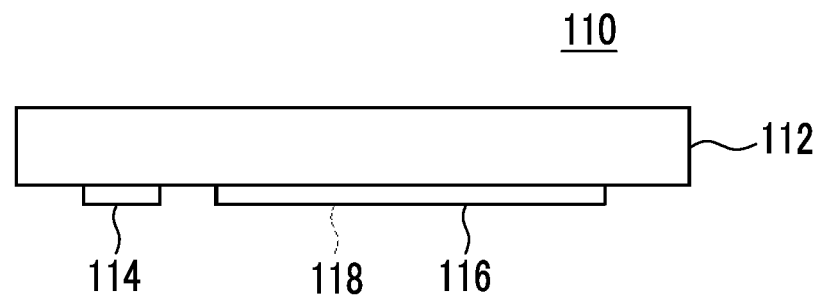
FIG. 16 is a top view of FIG. 15.

FIG. 15 is a front view schematically showing another example of the light guide element according to the embodiment of the present invention, and FIG. 16 is a top view of FIG. 15.

A light guide element 110 shown in FIGS. 15 and 16 includes a light guide plate 112, a first diffraction element 114, a second diffraction element 116, and a third diffraction element 118.

The first diffraction element 114 diffracts light incident from the outside at an angle at which the light can be totally reflected in the light guide plate 112.

The second diffraction element 116 diffracts light that is incident into the light guide plate 112 at a position of the first diffraction element 114 and propagated in the light guide plate 112 such that a light traveling direction in the light guide plate 112 is bent.

The third diffraction element 118 diffracts light that is diffracted by the second diffraction element 116 and propagated in the light guide plate 112 at an angle where the light can be emitted from the light guide plate 112 to the outside.

That is, in the light guide element 110 shown in FIGS. 15 and 16, light that is diffracted in the first diffraction element 114 for incidence and incident into the light guide plate 112 is diffracted by the intermediate second diffraction element 116 such that a light traveling direction is bent in the light guide plate 112, and then is diffracted by the third diffraction element 118 on the emission side to be emitted to the outside of the light guide plate 112.

In this configuration, exit pupil expansion can be performed in the second diffraction element 116 and/or the third diffraction element. At this time, by using the optical element according to the embodiment of the present invention as the second diffraction element 116 and/or the third diffraction element 118, the amount of light expanded can be made to be uniform. From the viewpoint that the light amount can be made to be more uniform, it is preferable that the optical element according to the embodiment of the present invention is used as the second diffraction element 116 and the third diffraction element 118.

In this case, the optical element according to the embodiment of the present invention may be included as the second diffraction element 116 and/or the third diffraction element, and various well-known diffraction elements of the related art such as a relief type diffraction element, a diffraction element using liquid crystal, or a volume hologram element can be used as other diffraction elements.

In a case where the optical element according to the embodiment of the present invention is used as the second diffraction element 116, the light diffracted due to the action of the second diffraction element 116 is reflected from an interface between the second diffraction element 116 and the outside (air) to be guided into the light guide plate 112. As a result, the second diffraction element 116 diffracts the light guided into the light guide plate 112 and bends a traveling direction of the light in the light guide plate 112 such that the light travels in a direction toward the third diffraction element 118.

It is preferable that each of the first diffraction element 114, the second diffraction element 116, and the third diffraction element 118 is an optical element that has a liquid crystal alignment pattern in which a direction of an optical axis derived from a liquid crystal compound changes while continuously rotating in at least one in-plane direction.

At this time, it is preferable that, in a case where lengths of single periods of the liquid crystal alignment patterns in the first diffraction element, the second diffraction element, and the third diffraction element are represented by $\Lambda_1$, $\Lambda_2$, and $\Lambda_3$, respectively, $\Lambda_2<\Lambda_1$, and $\Lambda_2<\Lambda_3$ are satisfied.

In a case where the lengths of the single periods of the liquid crystal alignment patterns of the first diffraction element, the second diffraction element, and the third diffraction element satisfy $\Lambda_2<\Lambda_1$, and $\Lambda_2<\Lambda_3$, light can be suitably propagated from the first diffraction element to the third diffraction element, and light can be appropriately emitted from the light guide plate to the user U.

The optical element according to the embodiment of the present invention can be used for various uses where transmission of light in a direction different from an incidence direction is allowed, for example, an optical path changing member, a light gathering element, a light diffusing element to a predetermined direction, a diffraction element, or the like in an optical device.

In the above-described example, the optical element according to the embodiment of the present invention is used as the optical element that allows transmission of visible light and refracts the transmitted light. However, the present invention is not limited to this example, and various configurations can be used.

For example, the optical element according to the embodiment of the present invention may have a configuration in which infrared light and/or ultraviolet light is refracted and transmitted.

Hereinabove, the optical element, the light guide element, and the image display device according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Comparative Example 1

<Preparation of First Optically-Anisotropic Member>
(Support and Saponification Treatment of Support)

As the support, a commercially available triacetyl cellulose film (manufactured by Fujifilm Corporation, Z-TAC) was prepared.

The support was caused to pass through an induction heating roll at a temperature of 60° C. such that the support surface temperature was increased to 40° C.

Next, an alkali solution shown below was applied to a single surface of the support using a bar coater in an application amount of 14 mL (liter)/m², the support was heated to 110° C., and the support was transported for 10 seconds under a steam infrared electric heater (manufactured by Noritake Co., Ltd.).

Next, 3 mL/m² of pure water was applied to a surface of the support to which the alkali solution was applied using the same bar coater. Next, water cleaning using a foundry coater and water draining using an air knife were repeated three times, and then the support was transported and dried in a drying zone at 70° C. for 10 seconds. As a result, the alkali saponification treatment was performed on the surface of the support.

Alkali Solution

| | |
|---|---|
| Potassium hydroxide | 4.70 parts by mass |
| Water | 15.80 parts by mass |
| Isopropanol | 63.70 parts by mass |
| Surfactant | 1.0 part by mass |
| SF-1: $C_{14}H_{29}O(CH_2CH_2O)_2OH$ | |
| Propylene glycol | 14.8 parts by mass |

(Formation of Undercoat Layer)

The following undercoat layer-forming coating solution was continuously applied to the surface of the support on which the alkali saponification treatment was performed using a #8 wire bar. The support on which the coating film was formed was dried using warm air at 60° C. for 60 seconds and was dried using warm air at 100° C. for 120 seconds. As a result, an undercoat layer was formed.

Undercoat Layer-Forming Coating Solution

| | |
|---|---|
| The following modified polyvinyl alcohol | 2.40 parts by mass |
| Isopropyl alcohol | 1.60 parts by mass |
| Methanol | 36.00 parts by mass |
| Water | 60.00 parts by mass |

Modified Polyvinyl Alcohol

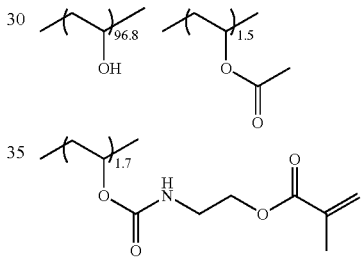

(Formation of Alignment Film)

The following alignment film-forming coating solution was continuously applied to the support on which the undercoat layer was formed using a #2 wire bar. The support on which the coating film of the alignment film-forming coating solution was formed was dried using a hot plate at 60° C. for 60 seconds. As a result, an alignment film was formed.

Alignment Film-Forming Coating Solution

| | |
|---|---|
| Material A for photo-alignment | 1.00 part by mass |
| Water | 16.00 parts by mass |
| Butoxyethanol | 42.00 parts by mass |
| Propylene glycol monomethyl ether | 42.00 parts by mass |

Material A for Photo-Alignment-

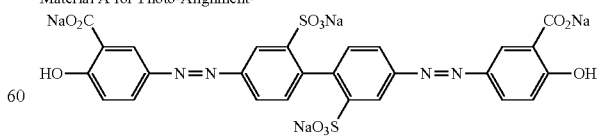

(Exposure of Alignment Film)

The alignment film was exposed using the exposure device shown in FIG. 9 to form an alignment film P-1 having an alignment pattern.

In the exposure device, a laser that emits laser light having a wavelength (325 nm) was used as the laser. The exposure dose of the interference light was 100 mJ/cm². By using the exposure device shown in FIG. 9, the single period of the alignment pattern gradually decreased toward the outer direction.

(Formation of First Optically-Anisotropic Layer)

As the liquid crystal composition forming the optically-anisotropic layer, the following composition A-1 was prepared.

Composition A-1

| | |
|---|---|
| Liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 936.00 parts by mass |

Liquid Crystal Compound L-1

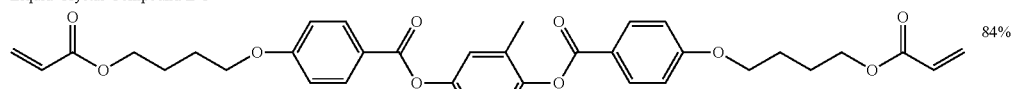
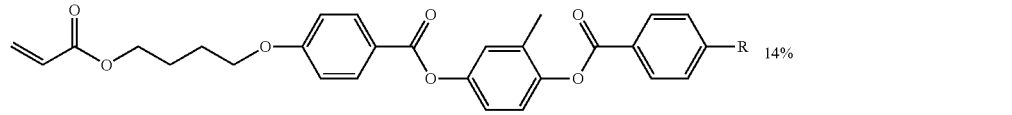
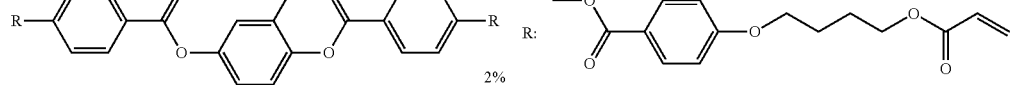

Leveling Agent T-1

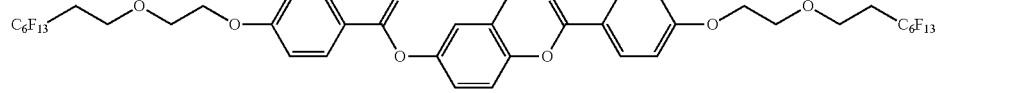

The first optically-anisotropic layer was formed by applying multiple layers of the composition A-1 to the alignment film P-1. The application of the multiple layers refers to repetition of the following processes including: preparing a first liquid crystal immobilized layer by applying the first layer-forming composition A-1 to the alignment film, heating the composition A-1, cooling the composition A-1, and irradiating the composition A-1 with ultraviolet light for curing; and preparing a second or subsequent liquid crystal immobilized layer by applying the second or subsequent layer-forming composition A-1 to the formed liquid crystal immobilized layer, heating the composition A-1, cooling the composition A-1, and irradiating the composition A-1 with ultraviolet light for curing as described above. Even in a case where the liquid crystal layer was formed by the application of the multiple layers such that the total thickness of the first optically-anisotropic layer was large, the alignment direction of the alignment film was reflected from a lower surface of the first optically-anisotropic layer to an upper surface thereof.

Regarding the first liquid crystal layer, the following composition A-1 was applied to the alignment film P-1 to form a coating film, the coating film was heated using a hot plate at 70° C., the coating film was cooled to 25° C., and the coating film was irradiated with ultraviolet light having a wavelength of 365 nm at an irradiation dose of 100 mJ/cm² using a high-pressure mercury lamp in a nitrogen atmosphere. As a result, the alignment of the liquid crystal compound was immobilized. At this time, the thickness of the first liquid crystal layer was 0.2 µm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, a first optically-anisotropic layer was formed, and a first optically-anisotropic member was prepared.

A complex refractive index of the cured layer of a liquid crystal composition A1 was obtained by applying the liquid crystal composition A1 a support with an alignment film for retardation measurement that was prepared separately, aligning the director of the liquid crystal compound to be parallel to the substrate, irradiating the liquid crystal compound with ultraviolet irradiation for immobilization to obtain a liquid crystal immobilized layer (cured layer), and measuring the retardation value and the thickness of the liquid crystal immobilized layer. Δn can be calculated by dividing the retardation value by the thickness. The retardation value was measured at a desired wavelength using Axoscan (manufactured by Axometrix Inc.), and the thickness was measured using a scanning electron microscope (SEM).

Finally, in the first optically-anisotropic layer, $\Delta n_{630} \times$ thickness (Re(630)) of the liquid crystals was 315 nm, and it was verified using a polarizing microscope that concentric circular (radial) periodic alignment occurred on the surface as shown in FIG. 8. In the liquid crystal alignment pattern of the first optically-anisotropic layer, regarding the single period over which the optical axis of the liquid crystal compound rotated by 180°, the single period of a center portion was 181 m, the single period of a portion at a distance of 5 mm from the center was 1.8 µm, the single period of a portion at a distance of 10 mm from the center was 1.0 μm. This way, the single period decreased toward the outer direction. In addition, the twist angle in the thickness direction of the first optically-anisotropic layer was 0° over the entire in-plane region. Hereinafter, unless specified otherwise, "$\Delta n_{630} \times d$" and the like were measured as described above.

Example 1

(Formation of First Optically-Anisotropic Layer)

As the liquid crystal composition forming the optically-anisotropic layer, the following composition A-2 was prepared.
Composition A-2

| | |
|---|---|
| Liquid crystal compound L-1 | 100.00 parts by mass |
| Chiral agent A having the following structure | 0.11 parts by mass |
| Polymerization initiator (IRGACURE (registered trade name) 907, manufactured by BASF SE) | 3.00 parts by mass |
| Leveling agent T-1 | 0.08 parts by mass |
| Methyl ethyl ketone | 936.00 parts by mass |

Chiral Agent A

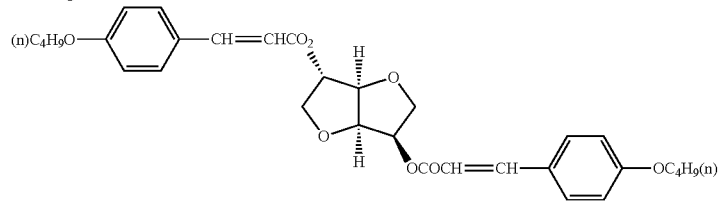

The first optically-anisotropic layer was formed by applying multiple layers of the composition A-2 to the alignment film P-1. The application of the multiple layers refers to repetition of the following processes including: preparing a first liquid crystal immobilized layer by applying the first layer-forming composition A-2 to the alignment film, heating the composition A-2, cooling the composition A-2, and irradiating the composition A-2 with ultraviolet light for curing; and preparing a second or subsequent liquid crystal immobilized layer by applying the second or subsequent layer-forming composition A-2 to the formed liquid crystal immobilized layer, heating the composition A-2, cooling the composition A-2, and irradiating the composition A-2 with ultraviolet light for curing as described above. Even in a case where the liquid crystal layer was formed by the application of the multiple layers such that the total thickness of the first optically-anisotropic layer was large, the alignment direction of the alignment film was reflected from a lower surface of the first optically-anisotropic layer to an upper surface thereof.

First, in order to form the first layer, the following composition A-2 was applied to the alignment film P-1, and the coating film was heated on a hot plate at 70° C. Next, the coating film was cooled to 25° C. and was irradiated with only ultraviolet light (i-ray) having a wavelength of 365 nm using a LED light source under a nitrogen atmosphere. At this time, the coating film was irradiated while changing the irradiation dose of ultraviolet light in a plane. Specifically, the coating film was irradiated while changing the irradiation dose to 200 mJ/cm² (center portion), 50 mJ/cm² (the distance of 5 mm from the center), and 30 mJ/cm² (the distance of 10 mm from the center) in a plane. Next, the coating film was heated to 70° C. on a hot plate, was cooled to 25° C., and was irradiated with mixed ultraviolet light having a wavelength of 350 nm or shorter using a high-pressure mercury lamp under a nitrogen atmosphere. As a result, the alignment of the liquid crystal compound was immobilized. At this time, the thickness of the first liquid crystal layer was 0.2 μm.

Regarding the second or subsequent liquid crystal layer, the composition was applied to the first liquid crystal layer, and then a liquid crystal immobilized layer was prepared under the same conditions as described above. This way, by repeating the application multiple times until the total thickness reached a desired thickness, a first optically-anisotropic layer was formed, and a first optically-anisotropic member was prepared.

Finally, in the first optically-anisotropic layer, $\Delta n_{630} \times$ thickness (Re(630)) of the liquid crystals was 315 nm, and it was verified using a polarizing microscope that concentric circular (radial) periodic alignment occurred on the surface as shown in FIG. 8. In the liquid crystal alignment pattern of the first optically-anisotropic layer, regarding the single period over which the optical axis of the liquid crystal compound rotated by 180°, the single period of a center portion was 181 μm, the single period of a portion at a distance of 5 mm from the center was 1.8 μm, the single period of a portion at a distance of 10 mm from the center was 1.0 μm. This way, the single period decreased toward the outer direction. In addition, regarding the twist angle in the thickness direction of the first optically-anisotropic layer, the twist angle at the center portion was 2°, the twist angle at the position at a distance of 5 mm from the center was 56°, and the twist angle at the position at a distance of 10 mm from the center was 74°. The twist angle increases toward the outer direction.

Example 2

A first optically-anisotropic layer was formed using the same method as that of Example 1, except that the chiral agent A was changed to a chiral agent B having the following structure and the amount thereof was 0.12 parts by mass. Using the first optically-anisotropic layer, a first optically-anisotropic member was prepared.

Chiral Agent B

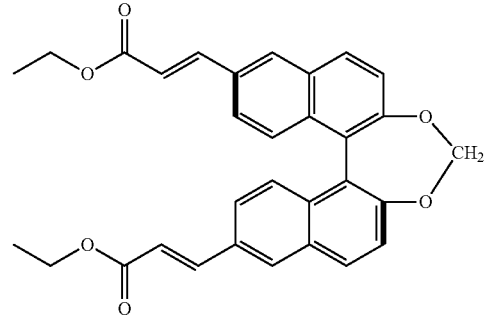

Finally, in the first optically-anisotropic layer, $\Delta n_{360} \times$ thickness (Re(630)) of the liquid crystals was 315 nm, and it was verified using a polarizing microscope that concentric circular (radial) periodic alignment occurred on the surface as shown in FIG. 8. In the liquid crystal alignment pattern of the first optically-anisotropic layer, regarding the single period over which the optical axis of the liquid crystal compound rotated by 180°, the single period of a center portion was 181 m, the single period of a portion at a distance of 5 mm from the center was 1.8 µm, the single period of a portion at a distance of 10 mm from the center was 1.0 µm. This way, the single period decreased toward the outer direction. In addition, regarding the twist angle in the thickness direction of the first optically-anisotropic layer, the twist angle at the center portion was 2°, the twist angle at the position at a distance of 5 mm from the center was 55°, and the twist angle at the position at a distance of 10 mm from the center was 73°. The twist angle increases toward the outer direction.

[Preparation of Circular Polarization Plate]

In order to perform "Measurement of Light Intensity" described below, a circular polarization plate was prepared as described below.

First, the support on which the undercoat layer was formed was prepared using the same method as that of Example 1.

(Formation of Alignment Film P-10)

The following alignment film P-10-forming coating solution was continuously applied to the support on which the undercoat layer was formed using a #2.4 wire bar. The support on which the coating film of the alignment film P-10-forming coating solution was formed was dried using a hot plate at 80° C. for 5 minutes. As a result, an alignment film P-10 was formed.

<Alignment Film P-10-Forming Coating Solution>

| | |
|---|---|
| Material for photo-alignment Polymer A2 | 4.35 parts by mass |
| Low molecular weight compound B2 | 0.80 parts by mass |
| Crosslinking agent C1 | 2.20 parts by mass |
| Compound D1 | 0.48 parts by mass |
| Compound D2 | 1.15 parts by mass |
| Butyl acetate | 100.00 parts by mass |

<<Synthesis of Polymer A2>>

100 parts by mass of 2-(3,4-epoxycyclohexyl)ethyltrimethoxysilane, 500 parts by mass of methyl isobutyl ketone, and 10 parts by mass of triethylamine were charged into a reaction vessel equipped with a stirrer, a thermometer, a dripping funnel, and a reflux cooling pipe and were mixed with each other at room temperature. Next, 100 parts by mass of deionized water was dropped for 30 minutes using a dripping funnel, and a reaction was caused to occur at 80° C. for 6 hours while mixing the components with each other under reflux. After completion of the reaction, the organic phase was extracted and was cleaned with 0.2 mass % ammonium nitrate aqueous solution until water used for cleaning was neutral. Next, by distilling off the solvent and water under reduced pressure, epoxy-containing polyorganosiloxane was obtained as a viscous transparent liquid.

In a case where the epoxy-containing polyorganosiloxane was analyzed by nuclear magnetic resonance ($^1$H-NMR), a peak having a theoretical intensity based on an oxiranyl group was obtained in the vicinity of chemical shift ($\delta$)=3.2 ppm, and it was verified that a side reaction of an epoxy group did not occur during the reaction. In the epoxy-containing polyorganosiloxane, the weight-average molecular weight Mw was 2,200, and the epoxy equivalent was 186 g/mol.

Next, 10.1 parts by mass of the epoxy-containing polyorganosiloxane obtained as described above, 0.5 parts by mass of an acrylic group-containing carboxylic acid (manufactured by Toagosei Co., Ltd., ARONIX M-5300, ω-carboxypolycaprolactone monoacrylate (polymerization degree n≈2)), 20 parts by mass of butyl acetate, 1.5 parts by mass of a cinnamic acid derivative obtained using a method of Synthesis Example 1 of JP2015-026050A, and 0.3 parts by mass of tetrabutylammonium bromide were charged into a 100 mL three-neck flask, and were stirred at 90° C. for 12 hours. After completion of the reaction solution was diluted with the same amount (mass) of butyl acetate as that of the reaction solution and was cleaned with water three times.

An operation of concentrating this solution and diluting the concentrated solution with butyl acetate was repeated twice. Finally, a solution including polyorganosiloxane (the following polymer A2) having a photo-alignable group was obtained. In the polymer A2, the weight-average molecular weight Mw was 9,000. In addition, as a result of $^1$H-NMR, the content of a component having a cinnamate group in the polymer A2 was 23.7 mass %.

-Polymer A2-

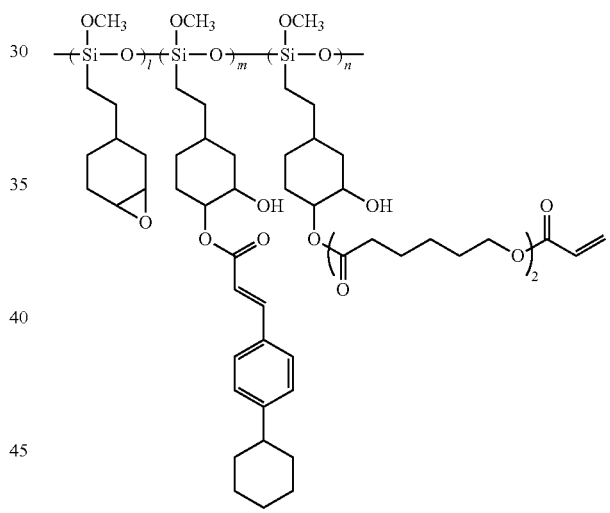

A2

—Low Molecular Weight Compound B2—

The low molecular weight compound B2 shown in the following table (manufactured by Nissin Ion Equipment Co., Ltd., NOMCOAT TAB) was used.

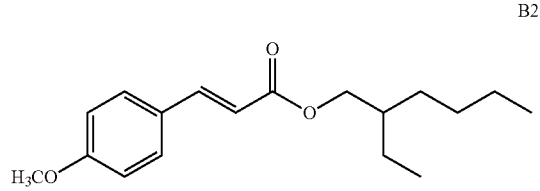 [SMILES: CCCCC(CC)COC(=O)/C=C/c1ccc(OC)cc1]

B2

—Crosslinking Agent C1—

The crosslinking agent C1 (manufactured by Nagase ChemteX Corporation, DENACOL EX411) shown in the following table was used.

—Compound D2—

The compound D2 (manufactured by Toyo Science Corp., triphenylsilanol) shown in the following table was used.

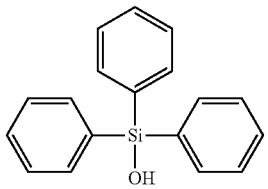

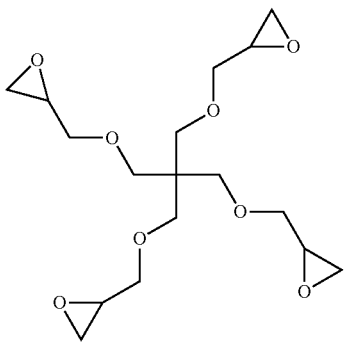

—Compound D1—

The following compound D1 (manufactured by Kawaken Fine Chemicals Co., Ltd., ALUMINUM CHELATE A(W)) shown in the following table was used.

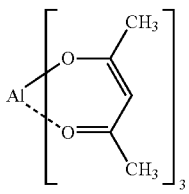

(Exposure of Alignment Film P-10)

By irradiating the obtained alignment film P-10 with polarized ultraviolet light (20 mJ/cm$^2$, using an extra high pressure mercury lamp), the alignment film P-10 was exposed.

[Preparation of λ/4 Plate]

The λ/4 plate was formed by applying a composition C-1 to the alignment film P-10. The applied coating film was heated using a hot plate at 110° C., the coating film was cooled to 60° C., and the coating film was irradiated with ultraviolet light having a wavelength of 365 nm at an irradiation dose of 500 mJ/cm$^2$ using a high-pressure mercury lamp in a nitrogen atmosphere. As a result, the alignment of the liquid crystal compound was immobilized, and an optically-anisotropic layer was prepared.

In the obtained λ/4 plate, $\Delta n_{630} \times d$ (Re(630)) was 157.5 nm.

Composition C-1

| | |
|---|---|
| Liquid crystal compound L-3 | 42.00 parts by mass |
| Liquid crystal compound L-4 | 42.00 parts by mass |
| Liquid crystal compound L-5 | 16.00 parts by mass |
| Polymerization initiator PI-1 | 0.50 parts by mass |
| Leveling agent G-1 | 0.20 parts by mass |
| Methyl ethyl ketone | 176.00 parts by mass |
| Cyclopentanone | 44.00 parts by mass |

Liquid Crystal Compound L-3-

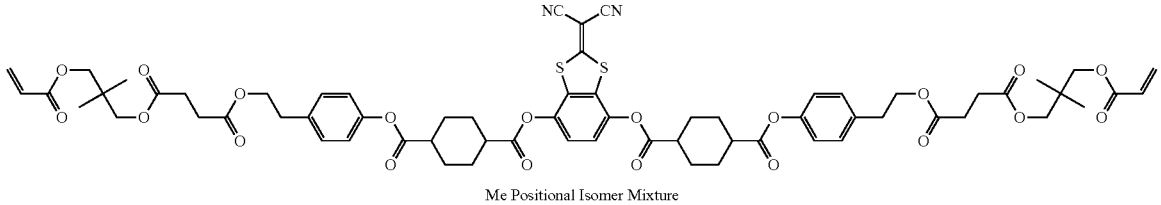

Me Positional Isomer Mixture

Liquid Crystal Compound L-4-

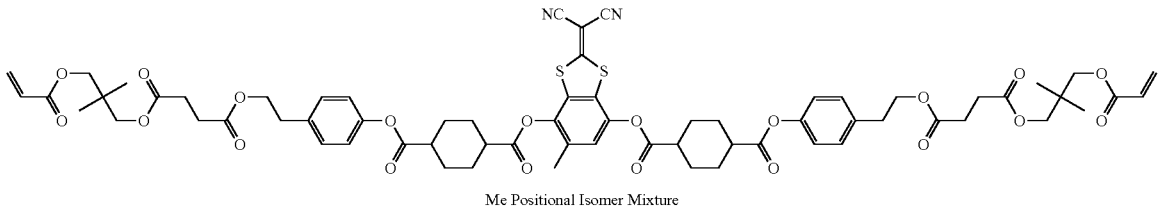 [SMILES: C=CC(=O)OCC(C)(C)COC(=O)CCC(=O)OCCc1ccc(OC(=O)C2CCC(C(=O)Oc3cc(C)c(OC(=O)C4CCC(C(=O)Oc5ccc(CCOC(=O)CCC(=O)OCC(C)(C)COC(=O)C=C)cc5)CC4)c4c3SC(=C(C#N)C#N)S4)CC2)cc1]

Me Positional Isomer Mixture

Liquid Crystal Compound L-5-

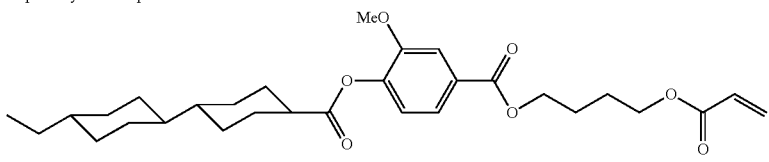

Polymerization initiator PI-1-

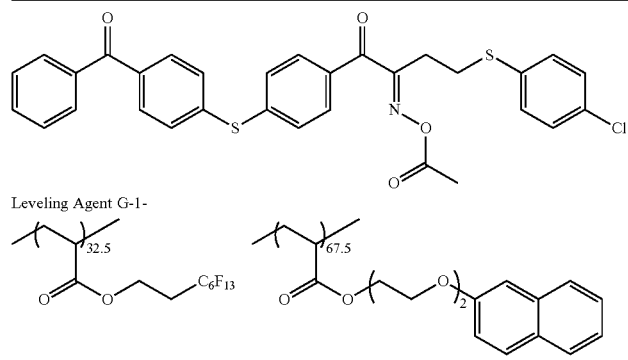

Leveling Agent G-1-

[Preparation of Circular Polarization Plate]

A polarizing plate was bonded to the triacetyl cellulose film side of the prepared λ/4 plate through a pressure sensitive adhesive to obtain a circular polarization plate.

[Measurement of Light Intensity]

Figure 11:
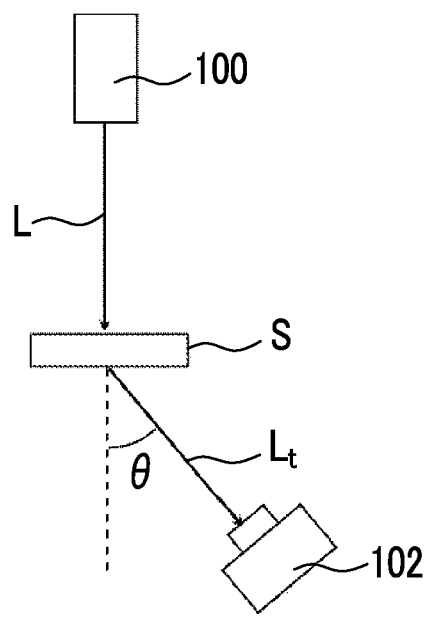
FIG. 11 is a conceptual diagram showing a method of measuring a light intensity.

Using a method shown in FIG. 11, a relative light intensity was measured.

In a case where light was incident into the prepared optical element from the front (direction with an angle of 0° with respect to the normal line), a relative light intensity of transmitted light with respect to the incidence light was measured.

Specifically, laser light L having an output center wavelength of 630 nm was caused to be vertically incident from a light source 100 into the prepared optical element S. Transmitted light was captured using a screen disposed at a distance of 100 cm to calculate a transmission angle. The intensity of transmitted light $L_t$ transmitted at a transmission angle θ was measured using a photodetector 102. A ratio between the light intensity of the transmitted light $L_t$ and the light intensity of the light L was obtained to obtain the value of the relative light intensity of the transmitted light $L_t$ relative to the incidence light (laser light L) (transmitted light $L_t$/laser light L). As the transmission angle θ, the transmission angle measured in advance was used.

Laser light was caused to be vertically incident into the circular polarization plate corresponding to the wavelength of the laser light to be converted into circularly polarized light, the circularly polarized light was incident into the prepared optical element, and the evaluation was performed.

In each of the liquid crystal alignment patterns of the prepared optical elements according to Comparative Examples 1 and Examples 1 and 2, laser light was caused to be vertically incident into the center portion and a position at a distance of 10 mm from the center of the concentric circle, a relative light intensity of the transmitted light relative to the incidence light was measured, and the results thereof were compared to each other. In Comparative Example 1, the transmission angle θ of the light incident into the center portion of the concentric circle was 0°, and the transmission angle θ of the light incident into the position at a distance of 10 mm from the center of the concentric circle was 39°. In Comparative Example 1, a relative light intensity of the transmitted light relative to the light incident into the position at a distance of 10 mm from the center of the concentric circle was lower than that of the transmitted light relative to the light incident into the center portion of the concentric circle by 30% or higher. In Examples 1 and 2, the transmission angle θ of the light incident into the center portion of the concentric circle was 0°, and the transmission angle θ of the light incident into the position at a distance of 10 mm from the center of the concentric circle was 39°. In Examples 1 and 2, in a case where a relative light intensity of the transmitted light relative to the light incident into the position at a distance of 10 mm from the center of the concentric circle was compared to that of the reflected light relative to the light incident into the center portion of the concentric circle, it was found that a decrease in relative light intensity was suppressed to be within 15%, and the refraction angle dependence of the amount of transmitted light in a plane was able to be reduced as compared to Comparative Example 1.

The optical element according to the embodiment of the present invention including optically-anisotropic layer, in which the optically-anisotropic layer has a liquid crystal alignment pattern in which a direction of an optical axis derived from a liquid crystal compound rotates in one in-plane direction, the optically-anisotropic layer has regions in which the optical axis is twisted in a thickness direction of the optically-anisotropic layer and rotates, the regions have different magnitudes of twist angles of the rotation in a plane. As a result, as can be seen from the above-described table, the refraction angle dependence of the amount of transmitted light in a plane is small, and, for example, in a case where light incident into different in-plane regions is refracted at different angles, the brightness of the transmitted light can be increased.

As can be seen from the above results, the effects of the present invention are obvious.

The present invention is suitably applicable to various uses where light is refracted in an optical device, for example, a diffraction element that causes light to be incident into a light guide plate of AR glasses or emits light to the light guide plate.

EXPLANATION OF REFERENCES

10: optical element
12: first optically-anisotropic member
20: support
24A: alignment film
26A: first optically-anisotropic layer
30: liquid crystal compound
30A: optical axis
34: optically-anisotropic layer
40: display (display element)
42: diffraction element
44: light guide plate 45: light guide element
50: AR display device (image display device)
60, 80: exposure device
62, 82: laser
64, 84: light source
65: λ/2 plate
68: beam splitter
70A, 70B, 90A, 90B: mirror
72A, 72B, 96: λ/4 plate
86, 94: polarization beam splitter
92: lens
100: laser
102: photodetector
110: light guide element
112: light guide plate
114: first diffraction element
116: second diffraction element
118: third diffraction element
M: laser light
MA, MB: beam
MP: P polarized light
MS: S polarized light
$P_O$: linearly polarized light
$P_R$: right circularly polarized light
$P_L$: left circularly polarized light
Q1, Q2: absolute phase
E1, E2: equiphase surface
S: sample
L: light
$L_t$: transmitted light

What is claimed is:

1. An optical element comprising:
an optically-anisotropic layer that is formed using a liquid crystal composition including a liquid crystal compound,
wherein the optically-anisotropic layer has a liquid crystal alignment pattern in which a direction of an optical axis derived from the liquid crystal compound changes while continuously rotating in at least one in-plane direction,
the optically-anisotropic layer has regions with different lengths of a rotational period in which the optical axis is twisted in a thickness direction of the optically-anisotropic layer and rotates, the regions having different magnitudes of twist angles per unit length in the thickness direction over which the direction of the optical axis is rotated by 180 degrees in the in-plane direction, in which the direction of the optical axis changes while continuously rotating in different positions in a plane, and
the optically-anisotropic layer allows transmission of light and diffracts light.

2. The optical element according to claim 1,
wherein in a case where a length over which the direction of the optical axis derived from the liquid crystal compound rotates by 180° in a plane is set as a single period, the optically-anisotropic layer has regions having different lengths of the single periods in the liquid crystal alignment pattern in the plane.

3. The optical element according to claim 2,
wherein a plurality of regions having different lengths of the single periods in the liquid crystal alignment pattern are arranged in order of the length of the single period in the optically-anisotropic layer in the plane,
the plurality of regions having different magnitudes of twist angles in the thickness direction are arranged in order of the magnitude of the twist angle in the thickness direction in the plane, and
the optically-anisotropic layer has a region in which a direction of a permutation of the lengths of the single periods is different from a direction of a permutation of the magnitudes of the twist angles in the thickness direction.

4. The optical element according to claim 1,
wherein the optically-anisotropic layer has a region in which the magnitudes of the twist angles over the entire region in the thickness direction are 10° to 360°.

5. The optical element according to claim 1,
wherein in the optically-anisotropic layer, the length of the single period in the liquid crystal alignment pattern gradually decreases in the in-plane direction in which the direction of the optical axis derived from the liquid crystal compound changes while continuously rotating in the liquid crystal alignment pattern.

6. The optical element according to claim 1,
wherein the liquid crystal alignment pattern of the optically-anisotropic layer is a concentric circular pattern having a concentric circular shape where the in-plane direction in which the direction of the optical axis derived from the liquid crystal compound changes while continuously rotating moves from an inside toward an outside.

7. The optical element according to claim 1, comprising:
a plurality optically-anisotropic layers,
wherein the optically-anisotropic layers have different directions of twist angles in the thickness direction of the optically-anisotropic layers.

8. The optical element according to claim 1, comprising:
a plurality optically-anisotropic layers,
wherein the optically-anisotropic layers have different magnitudes of twist angles in the thickness direction of the optically-anisotropic layers.

9. The optical element according to claim 7, comprising:
a plurality of optically-anisotropic layers,
wherein the optically-anisotropic layers have liquid crystal alignment patterns having the same direction in which a direction of an optical axis derived from the liquid crystal compound continuously rotates in at least one in-plane direction.

10. The optical element according to claim 1,
wherein the length of the single period in the liquid crystal alignment pattern is 50 μm or less.

11. A light guide element comprising:
a light guide plate; and
the optical element according to claim 1 to that is disposed on a surface of the light guide plate,
wherein the optical element is disposed such that the twist angle in the thickness direction of the optically-anisotropic layer gradually changes toward a traveling direction of light in the light guide plate.

12. A light guide element comprising:
a light guide plate;
a first diffraction element that is disposed on a surface of the light guide plate and diffracts light to be incident into the light guide plate;
a third diffraction element that diffracts light propagated in the light guide plate to be emitted to an outside of the light guide plate; and
a second diffraction element that diffracts light propagated from a position of the first diffraction element in the light guide plate in a direction toward the third diffraction element, wherein at least one of the second diffraction element or the third diffraction element is the optical element according to claim 1.

13. An image display device comprising:

the light guide element according to claim 11; and a display element that emits an image to the light guide element.

14. The image display device according to claim 13, wherein the display element emits circularly polarized light.

* * * * *